United States Patent
Liu et al.

(10) Patent No.: US 10,003,540 B2
(45) Date of Patent: Jun. 19, 2018

(54) FLOW FORWARDING METHOD, DEVICE, AND SYSTEM

(71) Applicant: Huawei Technologies Co., Ltd., Shenzhen (CN)

(72) Inventors: Enhui Liu, Beijing (CN); Xinping Wang, Beijing (CN); Chengyong Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 14/949,575

(22) Filed: Nov. 23, 2015

(65) Prior Publication Data

US 2016/0087905 A1 Mar. 24, 2016

Related U.S. Application Data

(63) Continuation of application No. PCT/CN2013/081940, filed on Aug. 21, 2013.

(30) Foreign Application Priority Data

May 24, 2013 (WO) ................ PCT/CN2013/076230

(51) Int. Cl.
*H04L 12/853* (2013.01)
*H04L 29/08* (2006.01)
(Continued)

(52) U.S. Cl.
CPC .......... *H04L 47/2416* (2013.01); *H04L 47/20* (2013.01); *H04L 47/2466* (2013.01);
(Continued)

(58) Field of Classification Search
CPC .................................................. H04L 47/2416
See application file for complete search history.

(56) References Cited

U.S. PATENT DOCUMENTS 6,279,035 B1 * 8/2001 Brown ............... H04Q 11/0478
370/412
7,796,608 B2 * 9/2010 Rawlins .................. H04L 45/10
370/351
(Continued)

FOREIGN PATENT DOCUMENTS

CN          1905517 A     1/2007
CN        101360349 A     2/2009
(Continued)

OTHER PUBLICATIONS

"OpenFlow Switch Specification," OpenFlow, Version 1.3.2 (Wire Protocol 0x04), pp. 1-131, The Open Networking Foundation, Palo Alto, California (Apr. 25, 2013).

*Primary Examiner* — Andrew Lai
*Assistant Examiner* — Andrew C Lee
(74) *Attorney, Agent, or Firm* — Leydig, Voit & Mayer, Ltd.

(57) ABSTRACT

The present application discloses a flow forwarding method, device, and system. The method includes: receiving, by an edge node, an intelligent routing service request packet, and the packet includes a constraint condition required for establishing the intelligent routing service; if the edge node does not find, in a flow table, a corresponding matching flow table entry of characteristic information, sending, by the edge node, a first message to a controller, where the first message includes identification information of the edge node and the characteristic information and the edge node is an ingress edge-node or an egress edge-node that receives the packet; receiving, a first flow table entry sent by the controller, where the first flow table entry is generated according to the first message and meets the constraint condition; and processing, according to the first flow table entry, a packet sent by the user side device.

18 Claims, 9 Drawing Sheets

(51) Int. Cl.
*H04L 12/813* (2013.01)
*H04L 12/855* (2013.01)
*H04L 12/859* (2013.01)
*H04L 12/851* (2013.01)
*H04L 12/717* (2013.01)

(52) U.S. Cl.
CPC ...... *H04L 47/2475* (2013.01); *H04L 47/2483* (2013.01); *H04L 67/32* (2013.01); *H04L 45/42* (2013.01)

(56) References Cited

U.S. PATENT DOCUMENTS

| | | | |
|---|---|---|---|
| 8,842,674 B2* | 9/2014 | Akiyoshi | 370/392 |
| 9,178,801 B1* | 11/2015 | Guichard | H04L 45/22 |
| 2007/0242667 A1 | 10/2007 | Liu | |
| 2010/0043068 A1* | 2/2010 | Varadhan | H04L 12/4633 726/15 |
| 2011/0090785 A1 | 4/2011 | Shimizu et al. | |
| 2011/0173336 A1 | 7/2011 | Xie | |
| 2013/0064243 A1* | 3/2013 | Akiyoshi | H04L 45/38 370/389 |
| 2013/0163426 A1* | 6/2013 | Beliveau | H04L 67/327 370/235 |
| 2013/0163427 A1* | 6/2013 | Beliveau | H04L 67/327 370/235 |
| 2013/0163475 A1* | 6/2013 | Beliveau | H04L 67/327 370/257 |
| 2013/0163602 A1* | 6/2013 | Kang | H04L 12/56 370/400 |
| 2014/0003433 A1* | 1/2014 | Narayanaswamy | H04L 67/327 370/392 |
| 2014/0098669 A1* | 4/2014 | Garg | H04L 47/12 370/235 |
| 2014/0241356 A1* | 8/2014 | Zhang | H04L 45/38 370/392 |
| 2014/0269288 A1* | 9/2014 | Crisan | H04L 47/2425 370/231 |
| 2014/0269319 A1* | 9/2014 | DeCusatis | H04L 47/12 370/236 |
| 2014/0328350 A1* | 11/2014 | Hao | H04L 47/80 370/401 |
| 2015/0023210 A1* | 1/2015 | Kis | H04L 45/563 370/254 |

FOREIGN PATENT DOCUMENTS

| | | |
|---|---|---|
| CN | 101594270 A | 12/2009 |
| CN | 102685006 A | 9/2012 |
| CN | 102938794 A | 2/2013 |
| WO | WO 2012077259 A1 | 6/2012 |
| WO | WO 2012081146 A1 | 6/2012 |
| WO | WO 2012090355 A1 | 7/2012 |
| WO | WO 2013042346 A1 | 3/2013 |

\* cited by examiner

FLOW FORWARDING METHOD, DEVICE, AND SYSTEM

CROSS-REFERENCE TO RELATED APPLICATIONS

This application is a continuation of International Patent Application No. PCT/CN2013/081940, filed on Aug. 21, 2013, which claims priority to PCT Patent Application No. PCT/CN2013/076230, filed on May 24, 2013, both of which are hereby incorporated by reference in their entireties.

TECHNICAL FIELD

The present application relates to the communications network field, and in particular, to a flow forwarding method, device, and system.

BACKGROUND

In 2006, Martin Casado, a student from Stanford University, led a project concerning network security and network management. By using a centralized controller, the project attempted to enable a network administrator to easily define security control policies that are based on a network flow, and apply these security control policies to various types of network devices, thereby implementing security control over the entire network communication. Inspired by this project, Martin and his advisor, Prof. Nick McKeown, found that: if the design is further generalized, that is, two functional modules, data forwarding (data plane) and routing control (control plane) of a traditional network device are separated from each other, and the centralized controller (Controller) is used to perform management and configuration for all types of network devices through a standardized interface, more possibilities can be brought for design, management, and use of network resources. Consequently, they proposed a concept of OpenFlow. Based on a programmable characteristic brought by OpenFlow for a network, Kate Greene further proposed a concept of a software defined network (Software Defined Network, SDN) during a selection of top ten cutting-edge technologies of the year 2009: If all network devices in a network are considered as managed resources, a concept of a network operating system (Network OS) may be abstracted by referring to a principle of an operating system. For one thing, this network operating system abstracts specific details of an underlying network device, and for another, provides a unified management view and programming interface for an upper-layer application. In this way, based on a platform of the network operating system, a user can develop a variety of application programs and use software to define a logical network topology, so as to meet different requirements on network resources, which does not need to consider a physical topology structure of an underlying network.

Therefore, an SDN/OpenFlow architecture is a new network architecture. Compared with IP route searching adopted in a traditional network, SDN/OpenFlow can implement flexible control over network traffic flow and provide a good platform for innovation of core networks and applications. SDN/OpenFlow is a direction of network architecture development in the future. However, the traditional network has the advantages of complete infrastructures and abundant resources. Therefore, research on the convergence of SDN/OpenFlow and the traditional network is of great significance.

However, as can be learned from the foregoing, it has been only several years up to now since SDN/OpenFlow emerged, and research on an SDN migration network (SDN Migration Network) that converges SDN/OpenFlow and the traditional network is far from sufficient. Therefore, up to now, how to ensure that a common user uses a traditional service normally while a VIP user is provided with an intelligent routing service of high quality and refined flow forwarding in the SDN migration network that converges SDN/OpenFlow and the traditional network has not been covered yet. That is, a network path is adjusted as required, so as to improve quality of service. It is defined in the present application that: a service that requires refined flow forwarding is referred to as an intelligent routing service, and a service that does not require refined flow forwarding is referred to as a common service. For example, a user originally watches a video in a common user manner, and now the user expects to upgrade to a VIP user, so as to obtain more bandwidth to ensure video smoothness, the user proposes an intelligent routing service request that requests reallocation of a flow forwarding network path with guaranteed quality for the user, so that the network path can ensure that the user has sufficient bandwidth for video watching.

SUMMARY

The present application provides a flow forwarding method, device, and system, which can implement a refined flow forwarding service in an SDN migration network, adjust a network path as required, and improve quality of service.

A first aspect of the present application provides a flow forwarding method, where the method is applied to an (SDN migration network) SDN migration network and the method includes: receiving, by an edge node, an intelligent routing service request packet sent by a user side device, where the intelligent routing service request packet is used to request a service server to provide an intelligent routing service for the user side device, and the intelligent routing service request packet includes a constraint condition required for establishing the intelligent routing service; if the edge node does not find, in a flow table, a corresponding matching flow table entry of characteristic information in the intelligent routing service request packet, sending, by the edge node, a first message to a controller, where the corresponding matching flow table entry includes the characteristic information, the first message includes identification information of the edge node and the characteristic information, and the edge node is an ingress edge-node or an egress edge-node that receives the intelligent routing service request packet in the SDN migration network; receiving, by the edge node, a first flow table entry sent by the controller, where the first flow table entry is generated according to the first message and meets the constraint condition; and processing, by the edge node according to the first flow table entry, a packet sent by the user side device.

With reference to the first aspect, in a first possible implementation manner of the first aspect of the present application, that the first message includes identification information of the edge node and the characteristic information is specifically that: the first message includes the intelligent routing service request packet and the identification information of the edge node, where the intelligent routing service request packet includes the characteristic information.

With reference to the first aspect, in a second possible implementation manner of the first aspect of the present application, the first message further includes the intelligent routing service request packet.

With reference to the first aspect, in a third possible implementation manner of the first aspect of the present application, that the first message includes identification information of the edge node and the characteristic information is specifically that: the first message includes a mirrored packet of the intelligent routing service request packet and the identification information of the edge node, where the mirrored packet of the intelligent routing service request packet is a duplicate packet of the intelligent routing service request packet, and the intelligent routing service request packet includes the characteristic information; and the method further includes: sending, by the edge node, the intelligent routing service request packet according to a traditional IP routing mode.

With reference to the first aspect, in a fourth possible implementation manner of the first aspect of the present application, the first message further includes a mirrored packet of the intelligent routing service request packet, where the mirrored packet of the intelligent routing service request packet is a duplicate packet of the intelligent routing service request packet; and the method further includes: sending, by the edge node, the intelligent routing service request packet according to a traditional IP routing mode.

With reference to the first aspect or any possible implementation manner of the first possible implementation manner to the fourth possible implementation manner of the first aspect, in a fifth possible implementation manner of the first aspect of the present application, the first message further includes interface attribute information of an interface that receives the intelligent routing service request packet, and the interface attribute information is used to indicate that the edge node is an ingress edge-node or an egress edge-node of the intelligent routing service request packet in the SDN migration network.

With reference to the first possible implementation manner of the first aspect or the second possible implementation manner of the first aspect, in a sixth possible implementation manner of the first aspect of the present application, the method further includes: receiving, by the edge node, a second message sent by the controller; and sending, by the edge node according to a traditional IP routing mode, the intelligent routing service request packet, where the second message includes the intelligent routing service request packet.

With reference to the first aspect or any possible implementation manner of the first possible implementation manner to the sixth possible implementation manner of the first aspect, in a seventh possible implementation manner of the first aspect of the present application, the characteristic information includes at least one of the following in the intelligent routing service request packet: a source address, a destination address, a source port, a destination port, and a protocol number.

With reference to the seventh possible implementation manner of the first aspect, in an eighth possible implementation manner of the first aspect of the present application, the characteristic information further includes an application-aware type.

With reference to the first aspect, in a ninth possible implementation manner of the first aspect of the present application, the constraint condition required for establishing the intelligent routing service is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

A second aspect of the present application provides a flow forwarding method, where the method is applied to an SDN migration network and the method includes: receiving, by an edge node, a service packet sent by a user side device; finding, in a flow table by the edge node, a first flow table entry corresponding to characteristic information in the service packet, where the first flow table entry includes an action, and the action is used to send a message to the controller; and the first flow table entry is generated by the controller according to an intelligent routing service request packet sent by the user side device; sending, by the edge node, a first message to the controller, where the first message includes the characteristic information, identification information of the edge node, and interface attribute information of an interface that receives the service packet, and the interface attribute information is used to indicate that the edge node is an ingress edge-node or an egress edge-node of the service packet in the SDN migration network; receiving, by the edge node, a second flow table entry sent by the controller, where the second flow table entry meets a constraint condition in the intelligent routing service request packet; and processing, by the edge node, the service packet according to the second flow table entry.

With reference to the second aspect, in a first possible implementation manner of the second aspect of the present application, that the first message includes the characteristic information, identification information of the edge node, and interface attribute information of an interface that receives the service packet is specifically that: the first message includes a mirrored packet of the service packet and the identification information of the edge node, where the mirrored packet of the service packet is a duplicate packet of the service packet, and the service packet includes the characteristic information; and the method further includes: sending, by the edge node, the service packet according to a traditional IP routing mode.

With reference to the second aspect, in a second possible implementation manner of the second aspect of the present application, the first message further includes a mirrored packet of the service packet, where the mirrored packet of the service packet is a duplicate packet of the service packet; and the method further includes: sending, by the edge node, the service packet according to a traditional IP routing mode.

With reference to the second aspect or the first possible implementation manner of the second aspect or the second possible implementation manner of the second aspect, in a third possible implementation manner of the second aspect of the present application, the characteristic information includes at least one of the following in the service request packet: a source address, a destination address, a source port, a destination port, and a protocol number.

With reference to the third possible implementation manner of the second aspect, in a fourth possible implementation manner of the second aspect of the present application, the characteristic information further includes an application-aware type.

With reference to the second aspect, in a fifth possible implementation manner of the second aspect of the present application, the constraint condition in the intelligent routing service request packet is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

A third aspect of the present application provides a flow forwarding method, where the method is applied to an SDN migration network and the method includes: receiving, by a controller, a first message sent by a first edge node, where the first message includes characteristic information of a packet sent by a user side device and identification information of the first edge node; receiving, by the controller, a second message sent by a second edge node, where the second message includes identification information of the second edge node and the characteristic information; determining, by the controller, that the first edge node is an ingress edge-node that receives the packet in the SDN migration network, and that the second edge node is an egress edge-node that receives the packet in the SDN migration network; computing, by the controller according to the identification information of the first edge node, the identification information of the second edge node, and a policy control factor, a flow forwarding path along which an intelligent routing service flow corresponding to the characteristic information needs to pass; and generating, by the controller for all nodes on the flow forwarding path, flow table entries respectively corresponding to the nodes, and sending the flow table entries separately to the corresponding nodes, where the policy control factor is determined according to a constraint condition in an intelligent routing service request packet sent by the user side device.

With reference to the third aspect, in a first possible implementation manner of the third aspect of the present application, when the packet is the intelligent routing service request packet, the determining, by the controller, that the first edge node is an ingress edge-node, and that the second edge node is an egress edge-node specifically includes: determining, by the controller according to a sequence of receiving the first message and the second message, that the first edge node is an ingress edge-node, and that the second edge node is an egress edge-node.

With reference to the third aspect, in a second possible implementation manner of the third aspect of the present application, the first message further includes first interface attribute information of a first interface, of the first edge node, that receives the packet, and the first interface attribute information is used to indicate that the first edge node is an ingress node of the packet in the SDN migration network; the second message further includes second interface attribute information of a second interface, of the second edge node, that receives the packet, and the second interface attribute information is used to indicate that the second edge node is an egress node of the service packet in the SDN migration network; and the determining, by the controller, that the first edge node is an ingress edge-node, and that the second edge node is an egress edge-node specifically includes: determining, by the controller according to the first interface attribute information and the second interface attribute information that are received, that the first edge node is the ingress edge-node, and that the second edge node is the egress edge-node.

With reference to the second possible implementation manner of the third aspect, in a third possible implementation manner of the third aspect of the present application, the method further includes: when the packet is a service packet, sending, by the controller, a first flow table entry separately to the first edge node and the second edge node, where the first flow table entry includes an action, and the action is used to send a message to the controller; and the first flow table entry is generated by the controller according to the intelligent routing service request packet sent by the user side device.

With reference to the third aspect or any possible implementation manner of the first possible implementation manner to the third possible implementation manner of the third aspect, in a fourth possible implementation manner of the third aspect of the present application, the method further includes: receiving, by the controller, the policy control factor and the characteristic information that are sent by a policy server.

With reference to the third aspect, in a fifth possible implementation manner of the third aspect of the present application, the characteristic information includes an application-aware type, and before the step of computing, by the controller according to the identification information of the first edge node, the identification information of the second edge node, and a policy control factor, a flow forwarding path along which an intelligent routing service flow corresponding to the characteristic information needs to pass, the method further includes:

performing deep packet inspection on the packet so as to determine whether the packet meets the application-aware type; if the packet meets the application-aware type, proceed with the following steps; if the packet does not meet the application-aware type, skip performing the following steps.

With reference to the third aspect, in a sixth possible implementation manner of the third aspect of the present application, the constraint condition in the intelligent routing service request packet is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

A fourth aspect of the present application provides a flow forwarding system method, where the method is applied to an (SDN migration network) SDN migration network and the method includes: receiving, by a first edge node, an intelligent routing service request packet sent by a user side device, where the intelligent routing service request packet is used to request a service server to provide an intelligent routing service for the user side device, and the intelligent routing service request packet includes a constraint condition required for establishing the intelligent routing service; if the first edge node does not find, in a flow table, a corresponding matching flow table entry of characteristic information in the intelligent routing service request packet, sending, by the first edge node, a first message to a controller, where the corresponding matching flow table entry includes the characteristic information, and the first message includes identification information of the first edge node and the characteristic information; receiving, by the controller, the first message sent by the first edge node; receiving, by a second edge node, the intelligent routing service request packet that is sent by the user side device and forwarded by the first edge node; if the second edge node does not find, in the flow table, the corresponding matching flow table entry of the characteristic information in the intelligent routing service request packet, sending, by the second edge node, a second message to the controller, where the corresponding matching flow table entry includes the characteristic information, and the second message includes identification information of the second edge node and the characteristic information; receiving, by the controller, the second message sent by the second edge node; determining, by the controller, that the first edge node is an ingress edge-node that receives the packet in the SDN migration network, and that the second edge node is an egress edge-node that receives the packet in the SDN migration network; computing, by the controller according to the identification information of the first edge node, the identification information of the second edge node, and a policy control factor, a flow forwarding path along which an intelligent routing service flow corresponding to the characteristic information needs to pass, where the policy control factor is determined according to the constraint condition in the intelligent routing service request packet sent by the user side device; generating, by the controller for all nodes on the flow forwarding path, flow table entries respectively corresponding to the nodes, and sending the flow table entries separately to the corresponding nodes, where the nodes include the first edge node and the second edge node; receiving, by the first edge node and the second edge node, the flow table entries sent by the controller; and processing, by the first edge node and the second edge node according to the flow table entries, a packet sent by the user side device.

With reference to the fourth aspect, in a first possible implementation manner of the fourth aspect of the present application, the characteristic information includes an application-aware type, and before the step of computing, by the controller according to the identification information of the first edge node, the identification information of the second edge node, and a policy control factor, a flow forwarding path along which an intelligent routing service flow corresponding to the characteristic information needs to pass, the method further includes: performing deep packet inspection on the packet so as to determine whether the packet meets the application-aware type; if the packet meets the application-aware type, proceed with the following steps; if the packet does not meet the application-aware type, skip performing the following steps.

With reference to the first possible implementation manner of the fourth aspect, in a second possible implementation manner of the fourth aspect of the present application, the constraint condition in the intelligent routing service request packet is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

A fifth aspect of the present application provides a flow forwarding method, where the method is applied to an (SDN migration network) SDN migration network and the method includes: receiving, by a first edge node, a service packet sent by a user side device, and finding, in a flow table by the first edge node, a first flow table entry corresponding to characteristic information in the service packet, where the first flow table entry includes an action, and the action is used to send a message to the controller; and the first flow table entry is generated by the controller according to an intelligent routing service request packet sent by the user side device; sending, by the first edge node, a first message to the controller, where the first message includes the characteristic information, identification information of the edge node, and interface attribute information of an interface that receives the service packet; receiving, by the controller, the first message sent by the first edge node; receiving, by a second edge node, the service packet that is sent by the user side device and forwarded by the first edge node, and finding, in the flow table by the second edge node, the first flow table entry corresponding to the characteristic information in the service packet, where the first flow table entry includes the action, and the action is used to send a message to the controller; sending, by the second edge node, a second message to the controller, where the second message includes the characteristic information, identification information of the edge node, and the interface attribute information of the interface that receives the service packet; receiving, by the controller, the second message sent by the second edge node; determining, by the controller, that the first edge node is an ingress edge-node that receives the packet in the SDN migration network, and that the second edge node is an egress edge-node that receives the packet in the SDN migration network; computing, by the controller according to the identification information of the first edge node, the identification information of the second edge node, and a policy control factor, a flow forwarding path along which an intelligent routing service flow corresponding to the characteristic information needs to pass; generating, by the controller for all nodes on the flow forwarding path, second flow table entries respectively corresponding to the nodes, and sending the second flow table entries separately to the corresponding nodes, where the policy control factor is determined according to a constraint condition in the intelligent routing service request packet sent by the user side device, and the nodes include the first edge node and the second edge node; receiving, by the first edge node and the second edge node, the second flow table entries sent by the controller, where the second flow table entries meet the constraint condition in the intelligent routing service request packet; and processing, by the first edge node and the second edge node, the service packet according to the second flow table entries.

With reference to the fifth aspect, in a first possible implementation manner of the fifth aspect of the present application, the characteristic information includes an application-aware type, and after the step of receiving, by the controller, the first message sent by the first edge node, the method further includes: performing deep packet inspection on the packet so as to determine whether the packet meets the application-aware type; if the packet meets the application-aware type, the following steps continue to be performed; if the packet does not meet the application-aware type, performing of the following steps is to be terminated.

With reference to the first possible implementation manner of the fifth aspect, in a second possible implementation manner of the fifth aspect of the present application, the constraint condition in the intelligent routing service request packet is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

A sixth aspect of the present application provides a hybrid forwarding device, where the device includes: a first receiving module, a searching and receiving module, a second receiving module, and a processing module, where: the first receiving module is configured to receive an intelligent routing service request packet sent by a user side device, where the intelligent routing service request packet is used to request a service server to provide an intelligent routing service for the user side device, the intelligent routing service request packet includes a constraint condition required for establishing the intelligent routing service, and the first receiving module sends the intelligent routing service request packet to the searching and receiving module; the searching and receiving module is configured to receive the intelligent routing service request packet, where when the edge node does not find, in a flow table, a corresponding matching flow table entry of characteristic information in the intelligent routing service request packet, the edge node sends a first message to a controller, where the corresponding matching flow table entry includes the characteristic information, the first message includes identification information of the edge node and the characteristic information, and the edge node is an ingress edge-node or an egress edge-node that receives the intelligent routing service request packet in the SDN migration network; the second receiving module is configured to receive a first flow table entry sent by the controller, where the first flow table entry is generated according to the first message and meets the constraint condition, and the second receiving module sends the first flow table entry to the processing module; and the processing module is configured to receive the first flow table entry and process, according to the first flow table entry, a packet sent by the user side device.

With reference to the sixth aspect, in a first possible implementation manner of the sixth aspect of the present application, that the first message includes identification information of the edge node and the characteristic information is specifically that: the first message includes the intelligent routing service request packet and the identification information of the edge node, where the intelligent routing service request packet includes the characteristic information.

With reference to the sixth aspect, in a second possible implementation manner of the sixth aspect of the present application, the first message further includes the intelligent routing service request packet.

With reference to the sixth aspect, in a third possible implementation manner of the sixth aspect of the present application, that the first message includes identification information of the edge node and the characteristic information is specifically that: the first message includes a mirrored packet of the intelligent routing service request packet and the identification information of the edge node, where the mirrored packet of the intelligent routing service request packet is a duplicate packet of the intelligent routing service request packet, and the intelligent routing service request packet includes the characteristic information; and the processing module is further configured to send the intelligent routing service request packet according to a traditional IP routing mode.

With reference to the sixth aspect, in a fourth possible implementation manner of the sixth aspect of the present application, that the first message includes identification information of the edge node and the characteristic information is specifically that: the first message includes a mirrored packet of the intelligent routing service request packet and the identification information of the edge node, where the mirrored packet of the intelligent routing service request packet is a duplicate packet of the intelligent routing service request packet, and the intelligent routing service request packet includes the characteristic information; and the processing module is further configured to be used by the edge node to send the intelligent routing service request packet according to a traditional IP routing mode.

With reference to the sixth aspect or any possible implementation manner of the first possible implementation manner to the fourth possible implementation manner of the sixth aspect, in a fifth possible implementation manner of the sixth aspect of the present application, the first message further includes interface attribute information of an interface that receives the intelligent routing service request packet, and the interface attribute information is used to indicate that the edge node is an ingress edge-node or an egress edge-node of the intelligent routing service request packet in the SDN migration network.

With reference to the first possible implementation manner of the sixth aspect or the second possible implementation manner of the sixth aspect, in a sixth possible implementation manner of the sixth aspect of the present application, the device further includes: a third receiving module, where the third receiving module receives a second message sent by the controller; and the processing module sends the intelligent routing service request packet according to a traditional IP routing mode, where the second message includes the intelligent routing service request packet.

With reference to the sixth aspect or any possible implementation manner of the first possible implementation manner to the sixth possible implementation manner of the sixth aspect, in a seventh possible implementation manner of the sixth aspect of the present application, the characteristic information includes at least one of the following in the intelligent routing service request packet: a source address, a destination address, a source port, a destination port, and a protocol number.

With reference to the seventh possible implementation manner of the sixth aspect, in an eighth possible implementation manner of the sixth aspect of the present application, the characteristic information further includes an application-aware type.

With reference to the sixth aspect, in a ninth possible implementation manner of the sixth aspect of the present application, the constraint condition required for establishing the intelligent routing service is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

A seventh aspect of the present application provides a hybrid forwarding device, where the device includes: a first receiving module, a searching module, a sending module, a second receiving module, and a processing module, where: the first receiving module is configured to receive a service packet sent by a user side device, and the first receiving module sends the service packet to the searching module;

the searching module is configured to receive the service packet and find, in a flow table, a first flow table entry corresponding to characteristic information in the service packet, where the first flow table entry includes an action, and the action is used to send a message to the controller; the first flow table entry is generated by the controller according to an intelligent routing service request packet sent by the user side device; and the searching module sends a finding result to the sending module; the sending module is configured to receive the finding result and send a first message to the controller, where the first message includes the characteristic information, identification information of the edge node, and interface attribute information of an interface that receives the service packet, and the interface attribute information is used to indicate that the edge node is an ingress edge-node or an egress edge-node of the service packet in the SDN migration network; the second receiving module is configured to receive a second flow table entry sent by the controller, where the second flow table entry meets a constraint condition in the intelligent routing service request packet, and the second receiving module sends the second flow table entry to the processing module; and the processing module is configured to receive the second flow table entry and process the service packet according to the second flow table entry.

With reference to the seventh aspect, in a first possible implementation manner of the seventh aspect of the present application, that the first message includes the characteristic information, identification information of the edge node, and interface attribute information of an interface that receives the service packet is specifically that: the first message includes a mirrored packet of the service packet and the identification information of the edge node, where the mirrored packet of the service packet is a duplicate packet of the service packet, and the service packet includes the characteristic information; and the processing module is further configured to be used by the edge node to send the service packet according to a traditional IP routing mode.

With reference to the seventh aspect, in a second possible implementation manner of the seventh aspect of the present application, the first message further includes a mirrored packet of the service packet, where the mirrored packet of the service packet is a duplicate packet of the service packet; and the processing module is further configured to send the service packet according to a traditional IP routing mode.

With reference to the seventh aspect or the first possible implementation manner of the seventh aspect or the second possible implementation manner of the seventh aspect, in a third possible implementation manner of the seventh aspect of the present application, the characteristic information includes at least one of the following in the service request packet: a source address, a destination address, a source port, a destination port, and a protocol number.

With reference to the third possible implementation manner of the seventh aspect, in a fourth possible implementation manner of the seventh aspect of the present application, the characteristic information further includes an application-aware type.

With reference to the seventh aspect, in a fifth possible implementation manner of the seventh aspect of the present application, the constraint condition in the intelligent routing service request packet is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

To resolve the foregoing problem, an eighth aspect of the present application provides a controller, where the controller further includes: a receiving module, a determining module, a computing module, and a sending module, where: the receiving module is configured to receive a first message sent by a first edge node, and receive a second message sent by a second edge node, where the first message includes characteristic information of a packet sent by a user side device and identification information of the first edge node, the second message includes identification information of the second edge node and the characteristic information, and the receiving module sends the first message and the second message to the determining module; the determining module is configured to determine that the first edge node is an ingress edge-node that receives the packet in the SDN migration network, and that the second edge node is an egress edge-node that receives the packet in the SDN migration network, and the determining module sends a determining result to the computing module; the computing module is configured to receive the determining result, and generate, for all nodes on the flow forwarding path, flow table entries respectively corresponding to the nodes, and the computing module sends the flow table entries to the sending module; and the sending module is configured to receive the flow table entries, and send the flow table entries separately to the corresponding nodes, where the policy control factor is determined according to a constraint condition in an intelligent routing service request packet sent by the user side device.

With reference to the eighth aspect, in a first possible implementation manner of the eighth aspect of the present application, the determining module is further configured to, when the packet is the intelligent routing service request packet, determine, according to a sequence of receiving the first message and the second message, that the first edge node is an ingress edge-node, and that the second edge node is an egress edge-node.

With reference to the eighth aspect, in a second possible implementation manner of the eighth aspect of the present application, the first message further includes first interface attribute information of a first interface, of the first edge node, that receives the packet, and the first interface attribute information is used to indicate that the first edge node is an ingress node of the packet in the SDN migration network; the second message further includes second interface attribute information of a second interface, of the second edge node, that receives the packet, and the second interface attribute information is used to indicate that the second edge node is an egress node of the service packet in the SDN migration network; and the processing module is further configured to determine, according to the first interface attribute information and the second interface attribute information that are received, that the first edge node is an ingress edge-node, and that the second edge node is an egress edge-node.

With reference to the second possible implementation manner of the eighth aspect, in a third possible implementation manner of the eighth aspect of the present application, the sending module is further configured to, when the packet is a service packet, send a first flow table entry separately to the first edge node and the second edge node, where the first flow table entry includes an action, and the action is used to send a message to the controller; and the first flow table entry is generated by the controller according to the intelligent routing service request packet sent by the user side device.

With reference to the eighth aspect or any possible implementation manner of the first possible implementation manner to the third possible implementation manner of the eighth aspect, in a fourth possible implementation manner of the eighth aspect of the present application, the receiving module is further configured to receive the policy control factor and the characteristic information that are sent by a policy server.

With reference to the eighth aspect, in a fifth possible implementation manner of the eighth aspect of the present application, the characteristic information includes an application-aware type, and before the step of computing, by the controller according to the identification information of the first edge node, the identification information of the second edge node, and a policy control factor, a flow forwarding path along which an intelligent routing service flow corresponding to the characteristic information needs to pass, the method further includes:

performing deep packet inspection on the packet so as to determine whether the packet meets the application-aware type, where if the packet meets the application-aware type, proceed with the following steps; if the packet does not meet the application-aware type, skip performing the following steps.

With reference to the eighth aspect, in a sixth possible implementation manner of the eighth aspect of the present application, the constraint condition in the intelligent routing service request packet is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

To resolve the foregoing problem, a ninth aspect of the present application provides a flow forwarding system, including a plurality of hybrid forwarding devices and a controller, where the plurality of hybrid forwarding devices are topologically connected to form an SDN migration network, hybrid forwarding devices located on an edge of the SDN migration network are edge nodes, the edge nodes can communicate with the controller, and the edge nodes include a first edge node and a second edge node, where: the first edge node receives an intelligent routing service request packet sent by a user side device, where the intelligent routing service request packet is used to request a service server to provide an intelligent routing service for the user side device, and the intelligent routing service request packet includes a constraint condition required for establishing the intelligent routing service; if the first edge node does not find, in a flow table, a corresponding matching flow table entry of characteristic information in the intelligent routing service request packet, the first edge node sends a first message to the controller, where the corresponding matching flow table entry includes the characteristic information, and the first message includes identification information of the first edge node and the characteristic information; the controller receives the first message sent by the first edge node; the second edge node receives the intelligent routing service request packet that is sent by the user side device and forwarded by the first edge node; if the second edge node does not find, in the flow table, the corresponding matching flow table entry of the characteristic information in the intelligent routing service request packet, the second edge node sends a second message to the controller, where the corresponding matching flow table entry includes the characteristic information, and the second message includes identification information of the second edge node and the characteristic information; the controller receives the second message sent by the second edge node; the controller determines that the first edge node is an ingress edge-node that receives the packet in the SDN migration network, and that the second edge node is an egress edge-node that receives the packet in the SDN migration network; the controller computes, according to the identification information of the first edge node, the identification information of the second edge node, and a policy control factor, a flow forwarding path along which an intelligent routing service flow corresponding to the characteristic information needs to pass; where the policy control factor is determined according to the constraint condition in the intelligent routing service request packet sent by the user side device; the controller generates, for all nodes on the flow forwarding path, flow table entries respectively corresponding to the nodes, and sends the flow table entries separately to the corresponding nodes, where the nodes include the first edge node and the second edge node; the first edge node and the second edge node receive flow table entries sent by the controller; and the first edge node and the second edge node process, according to the flow table entries, a packet sent by the user side device.

With reference to the ninth aspect, in a first possible implementation manner of the ninth aspect of the present application, the characteristic information includes an application-aware type, and before the step that the controller computes, according to the identification information of the first edge node, the identification information of the second edge node, and a policy control factor, a flow forwarding path along which an intelligent routing service flow corresponding to the characteristic information needs to pass, the method further includes: performing deep packet inspection on the packet, so as to determine whether the packet meets the application-aware type, where if the packet meets the application-aware type, proceed with the following steps; if the packet does not meet the application-aware type, skip performing the following steps.

With reference to the first possible implementation manner of the ninth aspect, in a second possible implementation manner of the ninth aspect of the present application, the constraint condition in the intelligent routing service request packet is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

To resolve the foregoing problem, a tenth aspect of the present application provides a flow forwarding system, including a plurality of hybrid forwarding devices and a controller, where the plurality of hybrid forwarding devices are topologically connected to form an SDN migration network, hybrid forwarding devices located on an edge of the SDN migration network are edge nodes, the edge nodes can communicate with the controller, and the edge nodes include a first edge node and a second edge node, where: the first edge node receives a service packet sent by a user side device, and the first edge node finds, in a flow table, a first flow table entry corresponding to characteristic information in the service packet, where the first flow table entry includes an action, and the action is used to send a message to the controller; and the first flow table entry is generated by the controller according to an intelligent routing service request packet sent by the user side device; the first edge node sends a first message to the controller, where the first message includes the characteristic information, identification information of the edge node, and interface attribute information of an interface that receives the service packet; the controller receives the first message sent by the first edge node; the second edge node receives the service packet that is sent by the user side device and forwarded by the first edge node, and the second edge node finds, in the flow table, the first flow table entry corresponding to the characteristic information in the service packet, where the first flow table entry includes the action, and the action is used to send a message to the controller; the second edge node sends a second message to the controller, where the second message includes the characteristic information, identification information of the edge node, and the interface attribute information of the interface that receives the service packet; the controller receives the second message sent by the second edge node; the controller determines that the first edge node is an ingress edge-node that receives the packet in the SDN migration network, and that the second edge node is an egress edge-node that receives the packet in the SDN migration network; the controller computes, according to the identification information of the first edge node, the identification information of the second edge node, and a policy control factor, a flow forwarding path along which an intelligent routing service flow corresponding to the characteristic information needs to pass; the controller generates, for all nodes on the flow forwarding path, second flow table entries respectively corresponding to the nodes, and sends the second flow table entries separately to corresponding nodes, where the policy control factor is determined according to a constraint condition in the intelligent routing service request packet sent by the user side device, and the nodes include the first edge node and the second edge node; the first edge node and the second edge node receive the second flow table entries sent by the controller, where the second flow table entries meet the constraint condition in the intelligent routing service request packet; and the first edge node and the second edge node process the service packet according to the second flow table entry.

With reference to the tenth aspect, in a first possible implementation manner of the tenth aspect of the present application, the characteristic information includes an application-aware type, and after the step that the controller receives the first message sent by the first edge node, the method further includes: performing deep packet inspection on the packet, so as to determine whether the packet meets the application-aware type, where if the packet meets the application-aware type, proceed with the following steps; if the packet does not meet the application-aware type, skip performing the following steps.

With reference to the first possible implementation manner of the tenth aspect, in a second possible implementation manner of the tenth aspect of the present application, the constraint condition in the intelligent routing service request packet is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

To resolve the foregoing problem, an eleventh aspect of the present application provides a hybrid forwarding device, where the device includes: a receiver, a processor, and a transmitter, where: the receiver is configured to receive an intelligent routing service request packet sent by a user side device, where the intelligent routing service request packet is used to request a service server to provide an intelligent routing service for the user side device, and the intelligent routing service request packet includes a constraint condition required for establishing the intelligent routing service; the processor is configured to find, in a flow table, a corresponding matching flow table entry of characteristic information in the intelligent routing service request packet, and the transmitter is configured to send a first message to a controller, where the corresponding matching flow table entry includes the characteristic information, the first message includes identification information of an edge node and the characteristic information, and the edge node is an ingress edge-node or an egress edge-node that receives the intelligent routing service request packet in an SDN migration network; the receiver is further configured to receive a first flow table entry sent by the controller, where the first flow table entry is generated according to the first message and meets the constraint condition; and the processor is configured to process, according to the first flow table entry, a packet sent by the user side device.

With reference to the eleventh aspect, in a first possible implementation manner of the eleventh aspect of the present application, that the first message includes identification information of the edge node and the characteristic information is specifically that: the first message includes the intelligent routing service request packet and the identification information of the edge node, where the intelligent routing service request packet includes the characteristic information.

With reference to the eleventh aspect, in a second possible implementation manner of the eleventh aspect of the present application, the first message further includes the intelligent routing service request packet.

With reference to the eleventh aspect, in a third possible implementation manner of the eleventh aspect of the present application, that the first message includes identification information of the edge node and the characteristic information is specifically that: the first message includes a mirrored packet of the intelligent routing service request packet and the identification information of the edge node, where the mirrored packet of the intelligent routing service request packet is a duplicate packet of the intelligent routing service request packet, and the intelligent routing service request packet includes the characteristic information; and the processor is further configured to send the intelligent routing service request packet according to a traditional IP routing mode.

With reference to the eleventh aspect, in a fourth possible implementation manner of the eleventh aspect of the present application, that the first message includes identification information of the edge node and the characteristic information is specifically that: the first message includes a mirrored packet of the intelligent routing service request packet and the identification information of the edge node, where the mirrored packet of the intelligent routing service request packet is a duplicate packet of the intelligent routing service request packet, and the intelligent routing service request packet includes the characteristic information; and the processor is further configured to be used by the edge node to send the intelligent routing service request packet according to a traditional IP routing mode.

With reference to the eleventh aspect or any possible implementation manner of the first possible implementation manner to the fourth possible implementation manner of the eleventh aspect, in a fifth possible implementation manner of the eleventh aspect of the present application, the first message further includes interface attribute information of an interface that receives the intelligent routing service request packet, and the interface attribute information is used to indicate that the edge node is an ingress edge-node or an egress edge-node of the intelligent routing service request packet in the SDN migration network.

With reference to the first possible implementation manner of the eleventh aspect or the second possible implementation manner of the eleventh aspect, in a sixth possible implementation manner of the eleventh aspect of the present application, the receiver is further configured to receive a second message sent by the controller; and the processor sends the intelligent routing service request packet according to a traditional IP routing mode, where the second message includes the intelligent routing service request packet.

With reference to the eleventh aspect or any possible implementation manner of the first possible implementation manner to the sixth possible implementation manner of the eleventh aspect, in a seventh possible implementation manner of the eleventh aspect of the present application, the characteristic information includes at least one of the following in the intelligent routing service request packet: a source address, a destination address, a source port, a destination port, and a protocol number.

With reference to the seventh possible implementation manner of the eleventh aspect, in an eighth possible implementation manner of the eleventh aspect of the present application, the characteristic information further includes an application-aware type.

With reference to the eleventh aspect, in a ninth possible implementation manner of the eleventh aspect of the present application, the constraint condition required for establishing the intelligent routing service is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

To resolve the foregoing problem, a twelfth aspect of the present application provides a hybrid forwarding device, where the device includes: a receiver, a processor, and a transmitter, where: the receiver is configured to receive a service packet sent by a user side device; the processor is configured to receive the service packet and find, in a flow table, a first flow table entry corresponding to characteristic information in the service packet, where the first flow table entry includes an action, and the action is used to send a message to the controller; and the first flow table entry is generated by the controller according to an intelligent routing service request packet sent by the user side device; the transmitter is configured to send a first message to the controller, where the first message includes the characteristic information, identification information of an edge node, and interface attribute information of an interface that receives the service packet, and the interface attribute information is used to indicate that the edge node is an ingress edge-node or an egress edge-node of the service packet in an SDN migration network; the receiver is further configured to receive a second flow table entry sent by the controller, where the second flow table entry meets a constraint condition in the intelligent routing service request packet; and the processor is configured to process the service packet according to the second flow table entry.

With reference to the twelfth aspect, in a first possible implementation manner of the twelfth aspect of the present application, that the first message includes the characteristic information, identification information of the edge node, and interface attribute information of an interface that receives the service packet is specifically that: the first message includes a mirrored packet of the service packet and the identification information of the edge node, where the mirrored packet of the service packet is a duplicate packet of the service packet, and the service packet includes the characteristic information; and the processor is further configured to be used by the edge node to send the service packet according to a traditional IP routing mode.

With reference to the twelfth aspect, in a second possible implementation manner of the twelfth aspect of the present application, the first message further includes a mirrored packet of the service packet, where the mirrored packet of the service packet is a duplicate packet of the service packet; and the processor is further configured to send the service packet according to a traditional IP routing mode.

With reference to the twelfth aspect or the first possible implementation manner of the twelfth aspect or the second possible implementation manner of the twelfth aspect, in a third possible implementation manner of the twelfth aspect of the present application, the characteristic information includes at least one of the following in the service request packet: a source address, a destination address, a source port, a destination port, and a protocol number.

With reference to the third possible implementation manner of the twelfth aspect, in a fourth possible implementation manner of the twelfth aspect of the present application, the characteristic information further includes an application-aware type.

With reference to the twelfth aspect, in a fifth possible implementation manner of the twelfth aspect of the present application, the constraint condition in the intelligent routing service request packet is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

To resolve the foregoing problem, a thirteenth aspect of the present application provides a controller, where the controller further includes: a receiver, a processor, and a transmitter, where: the receiver is configured to receive a first message sent by a first edge node, and receive a second message sent by a second edge node, where the first message includes characteristic information of a packet sent by a user side device and identification information of the first edge node, and the second message includes identification information of the second edge node and the characteristic information; the processor is configured to determine that the first edge node is an ingress edge-node that receives the packet in an SDN migration network, and that the second edge node is an egress edge-node that receives the packet in the SDN migration network; the processor is further configured to generate, for all nodes on a flow forwarding path, flow table entries respectively corresponding to the nodes; and the transmitter is configured to send the flow table entries separately to corresponding nodes, where a policy control factor is determined according to a constraint condition in an intelligent routing service request packet sent by the user side device.

With reference to the thirteenth aspect, in a first possible implementation manner of the thirteenth aspect of the present application, the processor is further configured to, when the packet is the intelligent routing service request packet, determine, according to a sequence of receiving the first message and the second message, that the first edge node is an ingress edge-node, and that the second edge node is an egress edge-node.

With reference to the thirteenth aspect, in a second possible implementation manner of the thirteenth aspect of the present application, the first message further includes first interface attribute information of a first interface, of the first edge node, that receives the packet, and the first interface attribute information is used to indicate that the first edge node is an ingress node of the packet in the SDN migration network; the second message further includes second interface attribute information of a second interface, of the second edge node, that receives the packet, and the second interface attribute information is used to indicate that the second edge node is an egress node of the service packet in the SDN migration network; and the processor is further configured to determine, according to the first interface attribute information and the second interface attribute information that are received, that the first edge node is an ingress edge-node, and that the second edge node is an egress edge-node.

With reference to the second possible implementation manner of the thirteenth aspect, in a third possible implementation manner of the thirteenth aspect of the present application, the transmitter is further configured to, when the packet is a service packet, send a first flow table entry separately to the first edge node and the second edge node, where the first flow table entry includes an action, and the action is used to send a message to the controller; and the first flow table entry is generated by the controller according to the intelligent routing service request packet sent by the user side device.

With reference to the thirteenth aspect or any possible implementation manner of the first possible implementation manner to the third possible implementation manner of the thirteenth aspect, in a fourth possible implementation manner of the thirteenth aspect of the present application, the receiver is further configured to receive the policy control factor and the characteristic information that are sent by a policy server.

With reference to the thirteenth aspect, in a fifth possible implementation manner of the thirteenth aspect of the present application, the characteristic information includes an application-aware type, before the step that the controller computes, according to the identification information of the first edge node, the identification information of the second edge node, and a policy control factor, a flow forwarding path along which an intelligent routing service flow corresponding to the characteristic information needs to pass, the method further includes: performing deep packet inspection on the packet, so as to determine whether the packet meets the application-aware type, where if the packet meets the application-aware type, proceed with the following steps; if the packet does not meet the application-aware type, skip performing the following steps.

With reference to the thirteenth aspect, in a sixth possible implementation manner of the thirteenth aspect of the present application, the constraint condition in the intelligent routing service request packet is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

To resolve the foregoing problem, a fourteenth aspect of the present application provides a flow forwarding method, where the method is applied to an SDN migration network and the method includes: receiving, by an edge node, a service packet sent by a user side device; finding, in a flow table by the edge node, a first flow table entry corresponding to characteristic information in the service packet, where the first flow table entry includes an action, and the action is used to send a message to the controller; and the first flow table entry is generated by the controller according to a preset object of an intelligent routing service; sending, by the edge node, a first message to the controller, where the first message includes the characteristic information, identification information of the edge node, and interface attribute information of an interface that receives the service packet, and the interface attribute information is used to indicate that the edge node is an ingress edge-node or an egress edge-node of the service packet in the SDN migration network; receiving, by the edge node, a second flow table entry sent by the controller, where the second flow table entry meets a constraint condition in an intelligent routing service request packet sent by the user side device; and processing, by the edge node, the service packet according to the second flow table entry.

With reference to the fourteenth aspect, in a first possible implementation manner of the fourteenth aspect of the present application, that the first message includes the characteristic information, identification information of the edge node, and interface attribute information of an interface that receives the service packet is specifically that: the first message includes a mirrored packet of the service packet and the identification information of the edge node, where the mirrored packet of the service packet is a duplicate packet of the service packet, and the service packet includes the characteristic information; and the method further includes: sending, by the edge node, the service packet according to a traditional IP routing mode.

With reference to the fourteenth aspect, in a second possible implementation manner of the fourteenth aspect of the present application, the first message further includes a mirrored packet of the service packet, where the mirrored packet of the service packet is a duplicate packet of the service packet; and the method further includes: sending the service packet according to a traditional IP routing mode.

With reference to the fourteenth aspect or the first possible implementation manner of the fourteenth aspect or the second possible implementation manner of the fourteenth aspect, in a third possible implementation manner of the fourteenth aspect of the present application, the characteristic information includes at least one of the following in the service request packet: a source address, a destination address, a source port, a destination port, and a protocol number.

With reference to the third possible implementation manner of the fourteenth aspect, in a fourth possible implementation manner of the fourteenth aspect of the present application, the characteristic information further includes an application-aware type.

With reference to the fourteenth aspect, in a fifth possible implementation manner of the fourteenth aspect of the present application, the constraint condition required for the intelligent routing service is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

To resolve the foregoing problem, a fifteenth aspect of the present application provides a hybrid forwarding device, where the device includes: a first receiving module, a searching module, a sending module, a second receiving module, and a processing module, where: the first receiving module is configured to receive a service packet sent by a user side device, and the first receiving module sends the service packet to the searching module; the searching module is configured to receive the service packet and find, in a flow table, a first flow table entry corresponding to characteristic information in the service packet, where the first flow table entry includes an action, and the action is used to send a message to the controller; the first flow table entry is generated by the controller according to a preset object of an intelligent routing service; and the searching module sends a finding result to the sending module; the sending module is configured to receive the finding result and send a first message to the controller, where the first message includes the characteristic information, identification information of an edge node, and interface attribute information of an interface that receives the service packet, and the interface attribute information is used to indicate that the edge node is an ingress edge-node or an egress edge-node of the service packet in an SDN migration network; the second receiving module is configured to receive a second flow table entry sent by the controller, where the second flow table entry meets a constraint condition in an intelligent routing service request packet sent by the user side device, and the second receiving module sends the second flow table entry to the processing module; and the processing module is configured to receive the second flow table entry and process the service packet according to the second flow table entry.

With reference to the fifteenth aspect, in a first possible implementation manner of the fifteenth aspect of the present application, that the first message includes the characteristic information, identification information of the edge node, and interface attribute information of an interface that receives the service packet is specifically that: the first message includes a mirrored packet of the service packet and the identification information of the edge node, where the mirrored packet of the service packet is a duplicate packet of the service packet, and the service packet includes the characteristic information; and the processing module is further configured to be used by the edge node to send the service packet according to a traditional IP routing mode.

With reference to the fifteenth aspect, in a second possible implementation manner of the fifteenth aspect of the present application, the first message further includes a mirrored packet of the service packet, where the mirrored packet of the service packet is a duplicate packet of the service packet; and the processing module is further configured to send the service packet according to a traditional IP routing mode.

With reference to the fifteenth aspect or the first possible implementation manner of the fifteenth aspect or the second possible implementation manner of the fifteenth aspect, in a third possible implementation manner of the fifteenth aspect of the present application, the characteristic information includes at least one of the following in the service request packet: a source address, a destination address, a source port, a destination port, and a protocol number.

With reference to the third possible implementation manner of the fifteenth aspect, in a fourth possible implementation manner of the fifteenth aspect of the present application, the characteristic information further includes an application-aware type.

With reference to the fifteenth aspect, in a fifth possible implementation manner of the fifteenth aspect of the present application, the constraint condition required for the intelligent routing service is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

To resolve the foregoing problem, a sixteenth aspect of the present application provides a hybrid forwarding device, where the device includes: a receiver, a processor, and a transmitter, where: the receiver is configured to receive a service packet sent by a user side device; the processor is configured to receive the service packet and find, in a flow table, a first flow table entry corresponding to characteristic information in the service packet, where the first flow table entry includes an action, and the action is used to send a message to the controller; and the first flow table entry is generated by the controller according to a preset object of an intelligent routing service; the transmitter is configured to send a first message to the controller, where the first message includes the characteristic information, identification information of an edge node, and interface attribute information of an interface that receives the service packet, and the interface attribute information is used to indicate that the edge node is an ingress edge-node or an egress edge-node of the service packet in an SDN migration network; the receiver is further configured to receive a second flow table entry sent by the controller, where the second flow table entry meets a constraint condition in an intelligent routing service request packet sent by the user side device; and the processor is configured to process the service packet according to the second flow table entry.

With reference to the sixteenth aspect, in a first possible implementation manner of the sixteenth aspect of the present application, that the first message includes the characteristic information, identification information of the edge node, and interface attribute information of an interface that receives the service packet is specifically that: the first message includes a mirrored packet of the service packet and the identification information of the edge node, where the mirrored packet of the service packet is a duplicate packet of the service packet, and the service packet includes the characteristic information; and the processor is further configured to be used by the edge node to send the service packet according to a traditional IP routing mode.

With reference to the sixteenth aspect, in a second possible implementation manner of the sixteenth aspect of the present application, the first message further includes a mirrored packet of the service packet, where the mirrored packet of the service packet is a duplicate packet of the service packet; and the processor is further configured to send the service packet according to a traditional IP routing mode.

With reference to the sixteenth aspect or the first possible implementation manner of the sixteenth aspect or the second possible implementation manner of the sixteenth aspect, in a third possible implementation manner of the sixteenth aspect of the present application, the characteristic information includes at least one of the following in the service request packet: a source address, a destination address, a source port, a destination port, and a protocol number.

With reference to the third possible implementation manner of the sixteenth aspect, in a fourth possible implementation manner of the sixteenth aspect of the present application, the characteristic information further includes an application-aware type.

With reference to the sixteenth aspect, in a fifth possible implementation manner of the sixteenth aspect of the present application, the constraint condition required for the intelligent routing service is a parameter for flow forwarding path computation performed on a data flow that matches the characteristic information, and the constraint condition includes at least one of the following: bandwidth, a bandwidth priority, a quality of service QoS priority, a latency level, a congestion level, and a value-added service identification number, where the value-added service identification number is used to identify a type of value-added service processing performed on the data flow that matches the characteristic information.

The foregoing solutions creatively proposed a manner in which a controller computes an intelligent routing service flow forwarding path according to identification information of a first edge node, identification information of a second edge node, and a policy control factor. A traditional forwarding manner of searching an IP routing table is combined with a flow forwarding manner of searching a flow table with high-quality service assurance, which does not affect traditional IP forwarding, thereby ensuring network reliability, and also providing a high-quality flow forwarding service for a VIP customer. By using this innovative method, a refined flow forwarding service is implemented in an SDN migration network, a network path is adjusted as required, and quality of service is improved, which fills a gap in this field.

DESCRIPTION OF EMBODIMENTS

In the following description, to illustrate rather than limit, specific details such as a particular system structure, an interface, and a technology are provided to make a thorough understanding of the present application. However, a person skilled in the art should understand that the present application may also be implemented in other embodiments without these specific details. In other cases, detailed descriptions of well-known apparatuses, circuits and methods are omitted, so that the present application is described without being disturbed by the unnecessary details.

In the following description, to illustrate rather than limit, specific details such as a particular system structure, an interface, and a technology are provided to make a thorough understanding of the present application. However, a person skilled in the art should understand that the present application may also be implemented in other embodiments without these specific details. In other cases, detailed descriptions of well-known apparatuses, circuits and methods are omitted, so that the present application is described without being disturbed by the unnecessary details.

Figure 1:
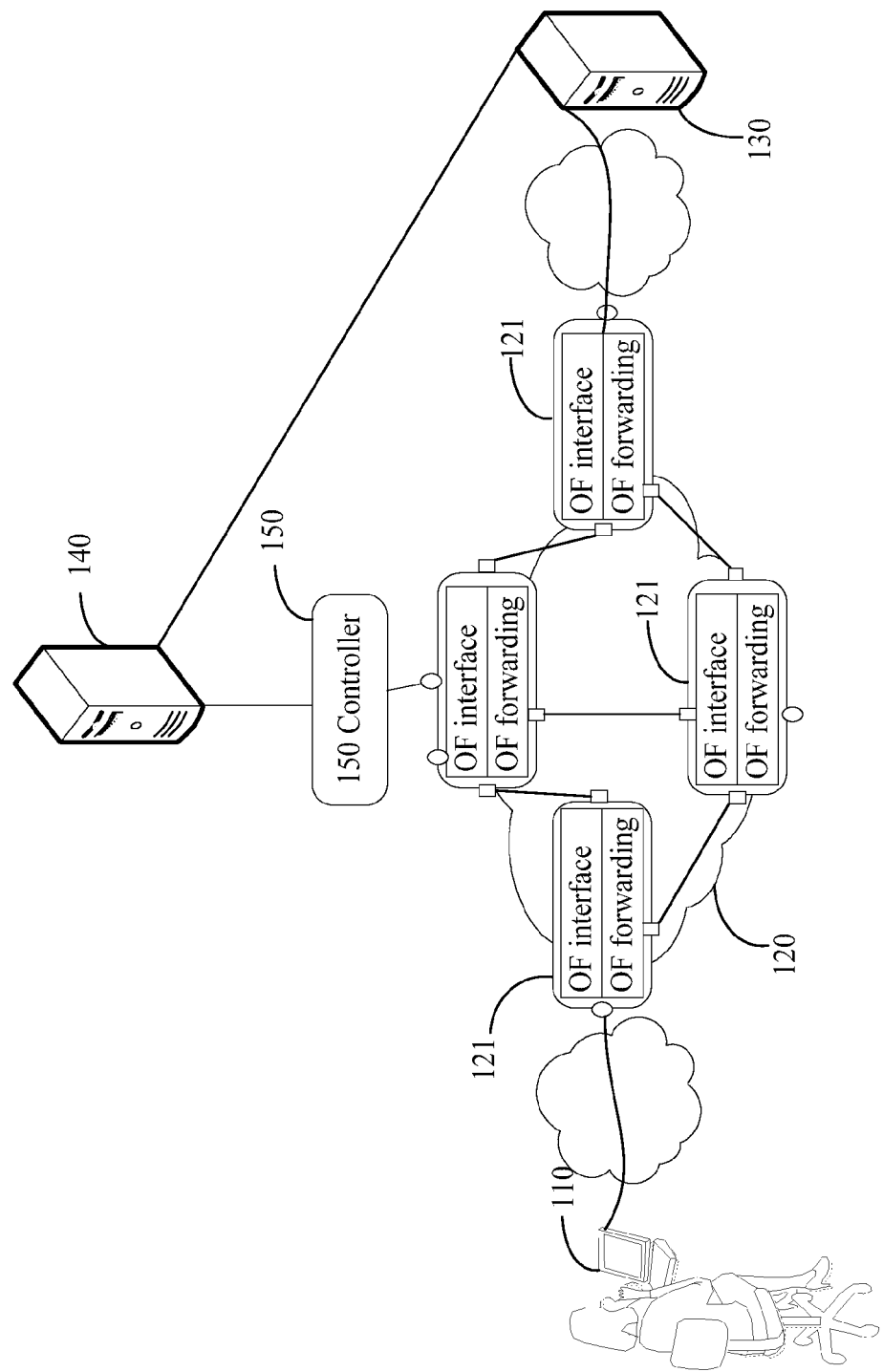
FIG. 1 is a schematic structural diagram of an embodiment of a flow forwarding system of the present application.

Referring to FIG. 1, FIG. 1 is a schematic structural diagram of an embodiment of a flow forwarding system of the present application. The flow forwarding system in this embodiment is applied to an SDN migration network, and includes a client 110, an SDN migration network 120 formed by a plurality of topologically-connected hybrid forwarding devices 121, an application server 130, a policy server 140, and a controller 150. The hybrid forwarding device 121 can implement a flow forwarding function of an SDN/OpenFlow network in addition to an IP routing and forwarding function of a traditional network. An external interface of the hybrid forwarding device 121 is used to connect to a device outside the SDN migration network 120. An internal interface of the hybrid forwarding device 121 is used to connect to another hybrid forwarding device 121 inside the SDN migration network 120. Hybrid forwarding devices 121 located on an edge of the SDN migration network 120 are edge nodes.

The client 110 is directly connected to an external interface of one edge node of the SDN migration network 120; the plurality of hybrid forwarding devices 121 in the SDN migration network 120 are topologically connected through internal interfaces; and the other edge node of the SDN migration network 120 is directly connected to the application server 130 through an external interface of the edge node. The application server 130 is connected to the policy server 140; the policy server 140 is connected to the controller 150; and the controller 150 is connected to any hybrid forwarding device 121 in the SDN migration network 120.

Figure 2:
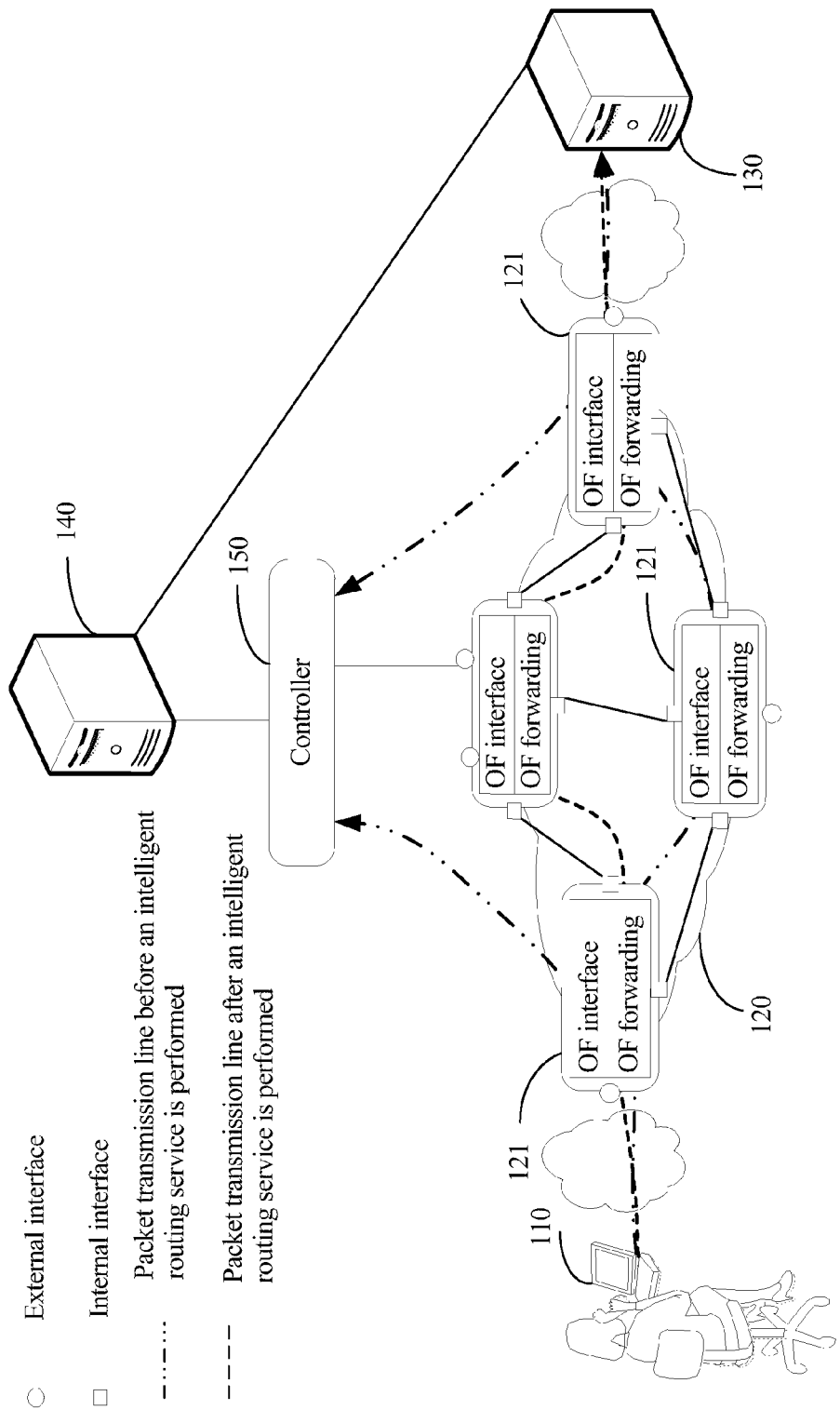
FIG. 2 is a schematic diagram of an embodiment of implementing an intelligent routing service by using the flow forwarding system shown in FIG. 1.

Referring to FIG. 2, FIG. 2 is a schematic diagram of an embodiment of implementing an intelligent routing service by using the flow forwarding system shown in FIG. 1.

In this embodiment, an external interface of an edge node is set as follows: when a corresponding matching flow table entry of characteristic information in an intelligent routing service request packet is not found in a flow table, the edge node sends a first message to a controller, where the first message includes identification information of the edge node and the characteristic information; and an internal interface of the edge node is set as follows: even if the characteristic information is not found in the flow table, the characteristic information of the intelligent routing service request packet is not sent to the controller. The characteristic information includes at least one of the following in the intelligent routing service request packet: a source address, a destination address, a source port, a destination port, and a protocol number. In addition, the characteristic information may further include an application-aware type.

In this embodiment, an intelligent routing service request packet and the identification information of the edge node are encapsulated in the first message, and the intelligent routing service request packet includes characteristic information. However, in another possible embodiment, an intelligent routing service request packet, characteristic information of the intelligent routing service request packet, and the identification information of the edge node may be together encapsulated in the first message.

The first message may further include interface attribute information of an interface that receives the intelligent routing service request packet, where the interface attribute information is used to indicate that the edge node is an ingress edge-node or an egress edge-node of the intelligent routing service request packet in an SDN migration network. Specifically, an edge node that receives an intelligent routing service request packet from an external interface whose interface attribute information is that the packet is an uplink packet is a first edge node; and an edge node that sends an intelligent routing service request packet through an external interface whose interface attribute information is that the packet is a downlink packet is a second edge node.

In another embodiment, the controller may determine, according to a sequence of receiving messages, that the first edge node is an ingress edge-node, and that the second edge node is an egress edge-node.

If a client 110 and an application server 130 perform refined intelligent routing flow forwarding on a data flow, characteristic information of the data flow is stored in a flow table of the first edge node and a flow table of the second edge node, and therefore the first edge node and the second edge node do not send an intelligent routing service packet to a controller 150. The first edge node and the second edge node send a service request packet of a data flow to the controller 150 only when the data flow (that may be an intelligent routing service flow and a common service flow) is newly initiated and characteristic information of the newly-initiated data flow is not stored in the first edge node and the second edge node.

Usually, a service packet generated when the client 110 performs a common service is sent to an SDN migration network 120 through an external interface of an edge node that is directly connected to the client 110. In the SDN migration network 120, according to a forwarding manner of searching an IP routing table in a traditional network, the service packet is sent, after being forwarded by internal interfaces of a plurality of hybrid forwarding devices 121, to an edge node that is directly connected to the application server 130. Then, the edge node that is directly connected to the application server 130 sends the service packet to the application server 130 through an external interface.

When the client 110 needs to perform an intelligent routing service, as shown by a dot-dashed line in the figure, the client 110 sends an intelligent routing service request to the application server 130 and generates an intelligent routing service request packet, where the intelligent routing service request packet is used to request a service server to provide the intelligent routing service for a user side device, and the intelligent routing service request packet includes the characteristic information and a constraint condition required for establishing the intelligent routing service. The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service (QoS) class may be set by setting a TOS (Type of Service) field in an IP (Internet Protocol) packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (Uniform Resource Locator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

The intelligent routing service request packet generated by the client 110 is sent, through the external interface, to the edge node that is directly connected to the client 110. The edge node that is directly connected to the client 110 is the first edge node. The characteristic information of the intelligent routing service request packet has not been recorded in the flow table of the first edge node in this case; therefore, according to the initial configuration "if an edge node does not find, in a flow table, a corresponding matching flow table entry of characteristic information in an intelligent routing service request packet, the edge node sends a first message to a controller", the first edge node knows that this is a data flow for which an intelligent routing service request is proposed, and the first edge node encapsulates the intelligent routing service request packet in the first message and sends the first message to the controller 150. The first message includes the intelligent routing service request packet and identification information of the first edge node, and the intelligent routing service request packet includes the characteristic information of the intelligent routing service request packet.

After receiving the first message, the controller 150 reads, from the first message, the characteristic information of the intelligent routing service request packet and the identification information of the first edge node. Then, the controller 150 encapsulates the intelligent routing service request packet in a second message and returns the second message to the first edge node.

A refined intelligent routing service flow forwarding path is not yet obtained in this case; therefore, according to a traditional forwarding manner of searching an IP routing table, the intelligent routing service request packet is sent, after being forwarded by the internal interfaces of the plurality of hybrid forwarding devices 121, to the edge node that is directly connected to the application server 130. The edge node that is directly connected to the application server 130 is the second edge node.

The characteristic information of the intelligent routing service request packet has not been recorded in the flow table of the second edge node in this case; therefore, according to the initial configuration "if an edge node does not find, in a flow table, a corresponding matching flow table entry of characteristic information in an intelligent routing service request packet, the edge node sends a first message to a controller", the second edge node knows that this is a data flow for which an intelligent routing service request is proposed, and the second edge node encapsulates the intelligent routing service request packet in the first message and sends the first message to the controller 150. The first message includes the intelligent routing service request packet and identification information of the second edge node, and the intelligent routing service request packet includes the characteristic information of the intelligent routing service request packet.

After receiving the first message, the controller 150 reads, from the first message, the characteristic information of the intelligent routing service request packet and the identification information of the second edge node. Then, the controller 150 encapsulates the intelligent routing service request packet in a second message and returns the second message to the second edge node.

After receiving the second message, the second edge node sends the intelligent routing service request packet to the application server 130 through the external interface.

After receiving the intelligent routing service request packet, the application server 130 knows that the client 110 proposes the intelligent routing service request; and obtains, from the intelligent routing service request packet, the constraint condition required for establishing the intelligent routing service. Therefore, the application server 130 sends, to a policy server 140, the constraint condition required by client 110 for establishing the intelligent routing service. The policy server 140 generates a policy control factor according to the constraint condition required for establishing the intelligent routing service, encapsulates the characteristic information of the intelligent routing service request packet and the policy control factor in a control policy, and then sends the control policy to the controller 150. After receiving the control policy, the controller 150 reads the characteristic information of the intelligent routing service request packet and the policy control factor and locally finds, according to the characteristic information of the intelligent routing service request packet, the identification information of the first edge node and the identification information of the second edge node that are associated with the characteristic information.

If the characteristic information further includes the application-aware type, the controller 150 needs to perform deep packet inspection on the packet, so as to determine whether the packet meets the application-aware type. If the packet meets the application-aware type, proceed with the following steps; if the packet does not meet the application-aware type, terminate the procedure; if the characteristic information does not include the application-aware type, perform the following steps directly.

Previously, the controller 150 has already received, in an IGP protocol snooping manner or the like, a topology connection diagram of the hybrid forwarding devices 121 in the SDN migration network 120. The controller 150 computes, according to interface information of the first edge node, interface information of the second edge node, the policy control factor, and the topology connection diagram of the hybrid forwarding devices 121 in the SDN migration network 120, an intelligent routing service flow forwarding path that meets a requirement of the client 110; and the controller 150 generates corresponding first flow table entries for all nodes in the intelligent routing service flow forwarding path and sends the first flow table entries separately to all the nodes.

After the intelligent routing service flow forwarding path is generated, as shown by a dashed line in the figure, a subsequent service packet sent by the client 110 is forwarded according to the intelligent routing service flow forwarding path after the subsequent service packet enters the SDN migration network 120, and finally, the subsequent service packet reaches the application server 130, thereby completing data transmission.

It may be understood that: in this embodiment, there is a short period from the time when the client 110 proposes the intelligent routing service request to the time when the controller 150 determines the intelligent routing service flow forwarding path; however, the first edge node and the second edge node are set as follows: when there is no characteristic information, of a data flow, in a flow table, a hybrid forwarding device sends, to the controller 150, an intelligent routing service request packet that is received through an external interface, and then returns the intelligent routing service request packet to the first edge node and the second edge node, so as to continue to send the intelligent routing service request packet to the server 130; therefore, if a problem occurs on the controller 150, the controller 150 cannot return the intelligent routing service request packet to the first edge node and the second edge node, and the first edge node and the second edge node cannot continue to send the intelligent routing service request packet to the application server 130, so that the intelligent routing service request packet cannot reach the application server 130. In this case, a newly-initiated intelligent routing service is affected because the characteristic information is not recorded in the flow table, and a newly-initiated common service is also affected because the characteristic information is not recorded in the flow table.

Figure 3:
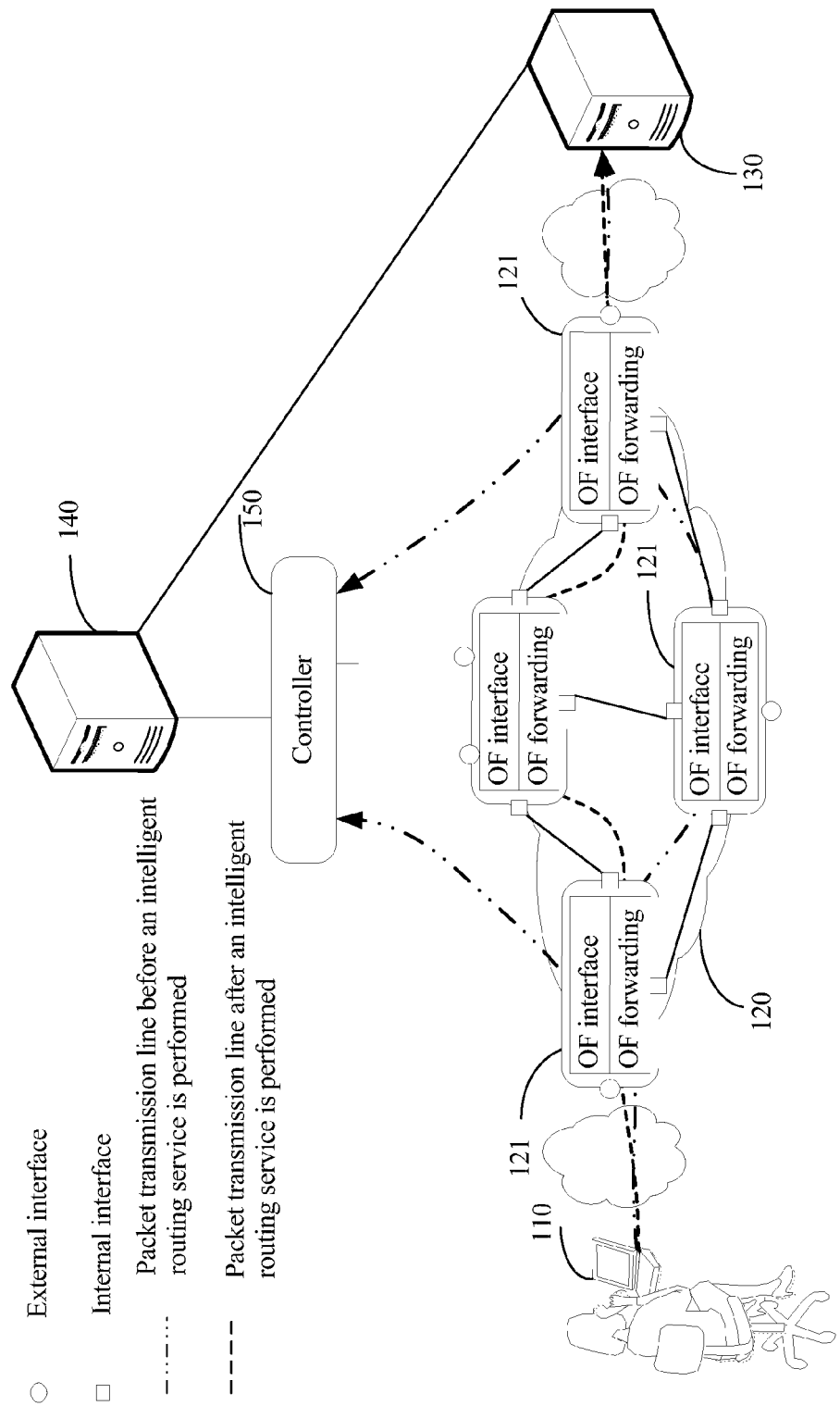
FIG. 3 is a schematic diagram of another embodiment of implementing an intelligent routing service by using the flow forwarding system shown in FIG. 1.

Referring to FIG. 3, FIG. 3 is a schematic diagram of another embodiment of implementing an intelligent routing service by using the flow forwarding system shown in FIG. 1.

In this embodiment, an external interface of an edge node is set as follows: when a corresponding matching flow table entry of characteristic information in an intelligent routing service request packet is not found in a flow table, the edge node sends a first message to a controller, where the first message includes identification information of the edge node and the characteristic information; and an internal interface of the edge node is set as follows: even if the characteristic information is not found in the flow table, the characteristic information of the intelligent routing service request packet is not sent to the controller. The characteristic information includes at least one of the following in the intelligent routing service request packet: a source address, a destination address, a source port, a destination port, and a protocol number. In addition, the characteristic information may further include an application-aware type.

In this embodiment, a mirrored packet of the intelligent routing service request packet and the identification information of the edge node are encapsulated in the first message, and the intelligent routing service request packet includes the characteristic information. Therefore, the mirrored packet also includes the characteristic information. However, in another possible embodiment, the mirrored packet, the characteristic information, and the identification information of the edge node may be together encapsulated in the first message.

The first message may further include interface attribute information of an interface that receives the intelligent routing service request packet, where the interface attribute information is used to indicate that the edge node is an ingress edge-node or an egress edge-node of the intelligent routing service packet in an SDN migration network. Specifically, an edge node that receives an intelligent routing service request packet from an external interface whose interface attribute information is that the packet is an uplink packet is a first edge node; and an edge node that sends an intelligent routing service request packet through an external interface whose interface attribute information is that the packet is a downlink packet is a second edge node.

In another embodiment, the controller may determine, according to a sequence of receiving messages, that the first edge node is an ingress edge-node, and that the second edge node is an egress edge-node.

If a client 110 and an application server 130 perform refined intelligent routing flow forwarding transmission on a data flow, characteristic information of the data flow is stored in a flow table of the first edge node and a flow table of the second edge node, and therefore the first edge node and the second edge node do not send the mirrored packet to a controller 150. The first edge node and the second edge node send a mirrored packet of a data flow to the controller 150 only when the data flow (that may be an intelligent routing service flow and a common service flow) is newly initiated and characteristic information of the newly-initiated data flow is not stored in the first edge node and the second edge node.

Usually, a service packet generated when the client 110 performs a common service is sent to an SDN migration network 120 through an external interface of an edge node that is directly connected to the client 110. In the SDN migration network 120, according to a forwarding manner of searching an IP routing table in a traditional network, the service packet is sent, after being forwarded by internal interfaces of a plurality of hybrid forwarding devices 121, to an edge node that is directly connected to the application server 130. Then, the edge node that is directly connected to the application server 130 sends the service packet to the application server 130 through an external interface.

When the client 110 needs to perform an intelligent routing service, as shown by a dot-dashed line in the figure, the client 110 sends an intelligent routing service request to the application server 130 and generates an intelligent routing service request packet, where the intelligent routing service request packet is used to request a service server to provide the intelligent routing service for a user side device, and the intelligent routing service request packet includes the characteristic information and a constraint condition required for establishing the intelligent routing service.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

The intelligent routing service request packet generated by the client 110 is sent, through the external interface, to the edge node that is directly connected to the client 110. The edge node that is directly connected to the client 110 is the first edge node. The characteristic information of the intelligent routing service request packet has not been recorded in the flow table of the first edge node in this case; therefore, according to the initial configuration "if an edge node does not find, in a flow table, a corresponding matching flow table entry of characteristic information in an intelligent routing service request packet, the edge node sends a first message to a controller", the first edge node knows that this is a data flow for which an intelligent routing service request is newly proposed. The first edge node performs mirroring on the intelligent routing service request packet to obtain a mirrored packet, that is, the mirrored packet of the intelligent routing service request packet is a duplicate packet of the intelligent routing service request packet; and then, the first edge node encapsulates the mirrored packet in the first message and sends the first message to the controller 150. The first message includes the mirrored packet and identification information of the first edge node, and the intelligent routing service request packet includes the characteristic information of the intelligent routing service request packet. Therefore, the mirrored packet also includes the characteristic information. After receiving the first message, the controller 150 reads the identification information of the first edge node and the characteristic information from the first message. However, the original intelligent routing service request packet (the intelligent routing service request packet on which mirroring is performed) is not encapsulated in the first message to be sent to the controller 150, but continues to be sent to the application server 130. A refined intelligent routing service flow forwarding path is not yet obtained in this case; therefore, according to a traditional forwarding manner of searching an IP routing table, the intelligent routing service request packet is sent, after being forwarded by the internal interfaces of the plurality of hybrid forwarding devices 121, to the edge node that is directly connected to the application server 130. The edge node that is directly connected to the application server 130 is the second edge node.

The characteristic information of the intelligent routing service request packet has not been recorded in the flow table of the second edge node in this case; therefore, according to the initial configuration "if an edge node does not find, in a flow table, a corresponding matching flow table entry of characteristic information in an intelligent routing service request packet, the edge node sends a first message to a controller", the second edge node knows that this is a data flow for which an intelligent routing service request is newly proposed. The second edge node performs mirroring on the intelligent routing service request packet to obtain a mirrored packet, that is, the mirrored packet of the intelligent routing service request packet is a duplicate packet of the intelligent routing service request packet; and then, the second edge node encapsulates the mirrored packet in the first message and sends the first message to the controller 150. The first message includes identification information of the second edge node and the mirrored packet, and the intelligent routing service request packet includes the characteristic information of the intelligent routing service request packet. Therefore, the mirrored packet also includes the characteristic information. After receiving the first message, the controller 150 reads the characteristic information and the identification information of the second edge node from the first message. However, the original intelligent routing service request packet is not encapsulated in the first message to be sent to the controller 150, but continues to be sent to the application server 130 through an external interface of the second edge node. After receiving the intelligent routing service request packet, the application server 130 knows that the client 110 proposes the intelligent routing service request; and obtains, from the intelligent routing service request packet, the constraint condition required for establishing the intelligent routing service.

Therefore, the application server 130 sends, to a policy server 140, the obtained constraint condition required for establishing the intelligent routing service. The policy server 140 obtains, by means of parsing, the constraint condition required for establishing the intelligent routing service and generates a policy control factor, and encapsulates characteristic information of the intelligent routing service flow and the policy control factor in a control policy, and then sends the control policy to the controller 150. After receiving the control policy, the controller 150 reads the constraint condition required for establishing the intelligent routing service and the policy control factor and locally finds, according to the characteristic information of the intelligent routing service flow, the identification information of the first edge node and the identification information of the second edge node that are associated with the characteristic information.

If the characteristic information further includes the application-aware type, the controller 150 needs to perform deep packet inspection on the packet, so as to determine whether the packet meets the application-aware type. If the packet meets the application-aware type, proceed with the following steps; if the packet does not meet the application-aware type, terminate the procedure; if the characteristic information does not include the application-aware type, perform the following steps directly.

Previously, the controller 150 has already received, in an IGP protocol snooping manner or the like, a topology connection diagram of the hybrid forwarding devices 121 in the SDN migration network 120. The controller 150 computes, according to the identification information of the first edge node, the identification information of the second edge node, the policy control factor, and the topology connection diagram of the hybrid forwarding devices 121 in the SDN migration network 120, an intelligent routing service flow forwarding path that meets a requirement of the client 110; and the controller 150 generates corresponding first flow table entries for all nodes in the intelligent routing service flow forwarding path and sends the first flow table entries separately to all the nodes.

After the intelligent routing service flow forwarding path is generated, as shown by a dashed line in the figure, a subsequent intelligent routing service packet sent by the client 110 is forwarded according to the intelligent routing service flow forwarding path after the subsequent intelligent routing service packet enters the SDN migration network 120, and finally, the subsequent intelligent routing service packet reaches the application server 130, thereby completing data transmission.

It may be understood that: this embodiment resolves the problem in the previous embodiment that: if a problem occurs on the controller 150, the controller 150 cannot return the intelligent routing service request packet to the first edge node and the second edge node, and therefore, the first edge node and the second edge node cannot continue to transmit the intelligent routing service request packet to the application server 130, so that a newly-initiated intelligent routing service is affected, and a newly-initiated common service is also affected. However, in this embodiment, one copy of both a newly-initiated intelligent routing service request packet and a newly-initiated common service request packet must be mirrored to the controller 150, which therefore causes relatively heavy load on the controller 150.

Figure 4:
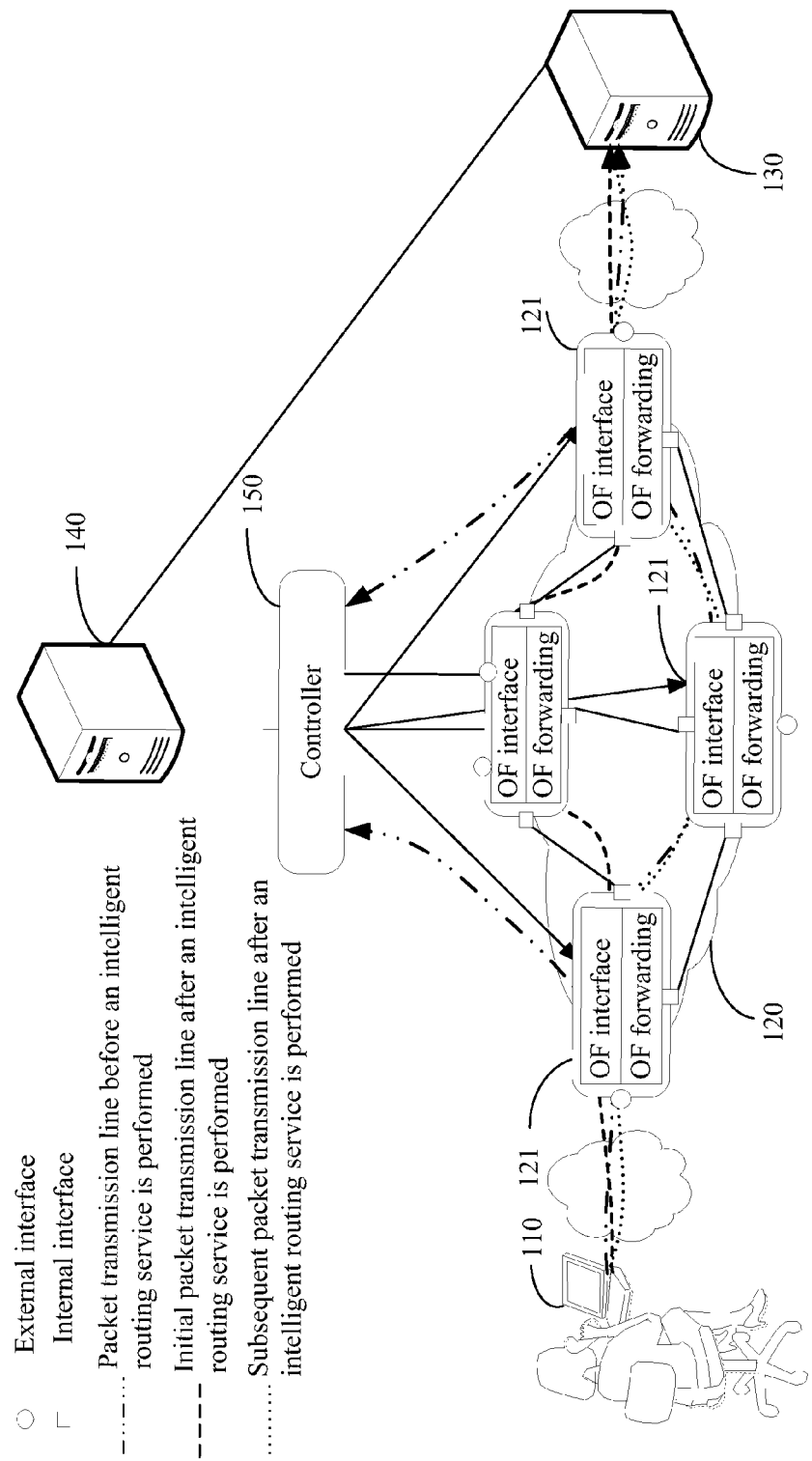
FIG. 4 is a schematic diagram of still another embodiment of implementing an intelligent routing service by using the flow forwarding system shown in FIG. 1.

Referring to FIG. 4, FIG. 4 is a schematic diagram of still another embodiment of implementing an intelligent routing service by using the flow forwarding system shown in FIG. 1.

In this embodiment, a controller delivers a first flow table entry to a hybrid forwarding device 121 as required, where the first flow table entry includes an action and characteristic information of an object that needs to perform an intelligent routing service, where the action is used to send a message to the controller, so that after a data flow with the characteristic information of the object that needs to perform the intelligent routing service enters an edge node, the edge node searches a flow table by using the characteristic information as an index. If a matching flow table entry is found, a packet is forwarded according to a traditional IP routing mode; in addition, a copy of the packet is mirrored.

Usually, a service packet generated when a client 110 performs a common service (not a newly-initiated common service) is sent to an SDN migration network 120 through an external interface of an edge node that is directly connected to the client 110. In the SDN migration network 120, according to a traditional forwarding manner of searching an IP routing table, the service packet is sent, after being forwarded by internal interfaces of a plurality of hybrid forwarding devices 121, to an edge node that is directly connected to an application server 130. Then, the edge node that is directly connected to the application server 130 sends the service packet to the application server 130 through an external interface.

When the client 110 needs to perform an intelligent routing service, as shown by a dotted line in the figure, the client 110 sends an intelligent routing service request to the application server 130 and generates an intelligent routing service request packet, where the intelligent routing service request packet is used to request a service server to provide the intelligent routing service for a user side device, and the intelligent routing service request packet includes characteristic information and a constraint condition required for establishing the intelligent routing service.

The characteristic information includes at least one of the following in the intelligent routing service request packet: a source address, a destination address, a source port, a destination port, and a protocol number. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

The intelligent routing service request packet generated by the client 110 is sent to the edge node that is directly connected to the client 110. In this case, the characteristic information of the intelligent routing service request packet is not recorded in a flow table of the edge node that is directly connected to the client 110; therefore, according to the traditional forwarding manner of searching an IP routing table, the intelligent routing service request packet is forwarded by the internal interfaces of the plurality of hybrid forwarding devices 121 and is sent, by the edge node that is directly connected to the client 110, to the edge node that is directly connected to the application server 130. Then, the edge node that is directly connected to the application server 130 sends the intelligent routing service request packet to the application server 130 through the external interface. After receiving the intelligent routing service request packet, the application server 130 knows that the client 110 proposes the intelligent routing service request; and obtains, from the intelligent routing service request packet, the characteristic information of the intelligent routing service request packet and the constraint condition required for establishing the intelligent routing service. Therefore, the application server 130 sends, to a policy server 140, the constraint condition required for establishing the intelligent routing service. The policy server 140 obtains, by means of parsing, the constraint condition required for establishing the intelligent routing service and generates a policy control factor, and encapsulates the characteristic information of the intelligent routing service request packet and the policy control factor in a control policy, and then sends the control policy to a controller 150. The controller 150 records, in a first flow table, the characteristic information of the intelligent routing service request packet and sends the first flow table separately to all hybrid forwarding devices 121.

In this case, the client 110 continues to send an intelligent routing service packet to the application server 130. As shown by a dot-dashed line in the figure, the intelligent routing service packet is sent to the edge node that is directly connected to the client 110. The edge node that is directly connected to the client 110 has already received the first flow table in this case, and characteristic information of the intelligent routing service packet is recorded in a first flow table entry; therefore, the edge node that is directly connected to the client 110 performs mirroring on the intelligent routing service packet to obtain a mirrored packet, and then the edge node encapsulates the mirrored packet in a first message and sends the first message to the controller 150. The first message includes the mirrored packet, identification information of the edge node, and interface attribute information of an interface that receives the intelligent routing service packet, and the mirrored packet includes the characteristic information of the intelligent routing service packet. The interface attribute information is used to indicate that the edge node is an ingress edge-node or an egress edge-node of the intelligent routing service packet in the SDN migration network.

In another embodiment, the characteristic information, the mirrored packet, the identification information of the edge node, and the interface attribute information of the interface that receives the service packet may be together included in the first message.

After receiving the first message, the controller 150 reads, from the first message, the characteristic information of the intelligent routing service request packet and the identification information of the edge node. If the characteristic information further includes the application-aware type, the controller 150 needs to perform deep packet inspection on the packet, so as to determine whether the packet meets the application-aware type. If the packet meets the application-aware type, proceed with the following steps; if the packet does not meet the application-aware type, terminate the procedure; if the characteristic information does not include the application-aware type, perform the following steps directly.

The controller 150 forwards the intelligent routing service packet according to a traditional IP routing mode, so as to continue to send the intelligent routing service packet to the application server 130. A refined intelligent routing service flow forwarding path is not yet obtained in this case; therefore, according to the traditional forwarding manner of searching an IP routing table, the intelligent routing service packet is sent, after being forwarded by the internal interfaces of the plurality of hybrid forwarding devices 121, to the edge node that is directly connected to the application server 130.

The edge node that is directly connected to the application server 130 has already received the first flow table in this case, and the characteristic information of the intelligent routing service packet is recorded in the first flow table entry; therefore, the edge node that is directly connected to the application server 130 performs mirroring on the intelligent routing service packet to obtain a mirrored packet, and the edge node encapsulates the mirrored packet in the first message and sends the first message to the controller 150. The first message includes the mirrored packet, the identification information of the edge node, and the interface attribute information of the interface that receives the service packet, and the mirrored packet includes the characteristic information of the intelligent routing service packet. In addition, on the other hand, the original intelligent routing service packet is forwarded according to the traditional IP routing mode, so as to continue to be sent to the application server 130 though the external interface of the edge node that is directly connected to the application server 130.

In another embodiment, the characteristic information, the mirrored packet, the identification information of the edge node, and the interface attribute information of the interface that receives the service packet may be together included in the first message. After receiving the first message, the controller 150 reads, from the first message, the characteristic information of the intelligent routing service packet, identification information of the edge node, and the interface attribute information of the interface that receives the service packet. A first edge node and a second edge node are determined according to the interface attribute information. For example, specifically, an edge node that receives an intelligent routing service request packet from an external interface whose interface attribute information is that the packet is an uplink packet is the first edge node; and an edge node that sends an intelligent routing service request packet through an external interface whose interface attribute information is that the packet is a downlink packet is the second edge node. Herein, the edge node that is directly connected to the client 110 is the first edge node, and the edge node that is directly connected to the application server 130 is the second edge node.

In another embodiment, the controller may determine, according to a sequence of receiving messages, that the first edge node is an ingress edge-node, and that the second edge node is an egress edge-node.

According to the characteristic information of the intelligent routing service packet, the controller 150 locally finds identification information of the first edge node, identification information of the second edge node, and the policy control factor that are associated with the characteristic information. Previously, the controller 150 has already received, in an IGP protocol snooping manner or the like, a topology connection diagram of the hybrid forwarding devices 121 in the SDN migration network 120. The controller 150 computes, according to the identification information of the first edge node, the identification information of the second edge node, the policy control factor, and the topology connection diagram of the hybrid forwarding devices 121 in the SDN migration network 120, an intelligent routing service flow forwarding path that meets a requirement of the client 110; and the controller 150 generates corresponding second flow tables for all nodes in the intelligent routing service flow forwarding path and sends the second flow tables respectively to all the nodes. In addition, after a second flow table is sent to the first edge node and the second edge node, the first edge node and the second edge node process the intelligent routing service packet according to a second flow table entry, and do not send a subsequent intelligent routing service packet to the controller 150 anymore, so as to reduce load on the controller 150.

After the intelligent routing service flow forwarding path is generated, as shown by a dashed line in the figure, a subsequent intelligent routing service packet sent by the client 110 is forwarded according to the intelligent routing service flow forwarding path after the subsequent intelligent routing service packet enters the SDN migration network 120, and finally, the subsequent intelligent routing service packet reaches the application server 130, thereby completing data transmission.

It may be understood that: only a newly-initiated packet of an intelligent routing service is mirrored as required, and a packet of a common service is not mirrored in this embodiment, which overcomes a problem in the previous embodiment that one copy of both a newly-initiated intelligent routing service request packet and a newly-initiated common service packet must be copied to the controller 150, thereby causing relatively heavy load on the controller 150. However, in this embodiment, only after an initially-sent intelligent routing service request packet is sent to the application server 130, the application server 130 can send characteristic information of the intelligent routing service request packet to the policy server 140; then, the characteristic information of the intelligent routing service request packet is forwarded to the controller 150, and the controller 150 records the characteristic information of the intelligent routing service request packet in the first flow table; and only after delivering the first flow table to each hybrid forwarding device 121, the controller 150 can mirror the intelligent routing service packet and further compute an intelligent routing service flow forwarding path. Therefore, this embodiment takes a slightly longer time.

Figure 5:
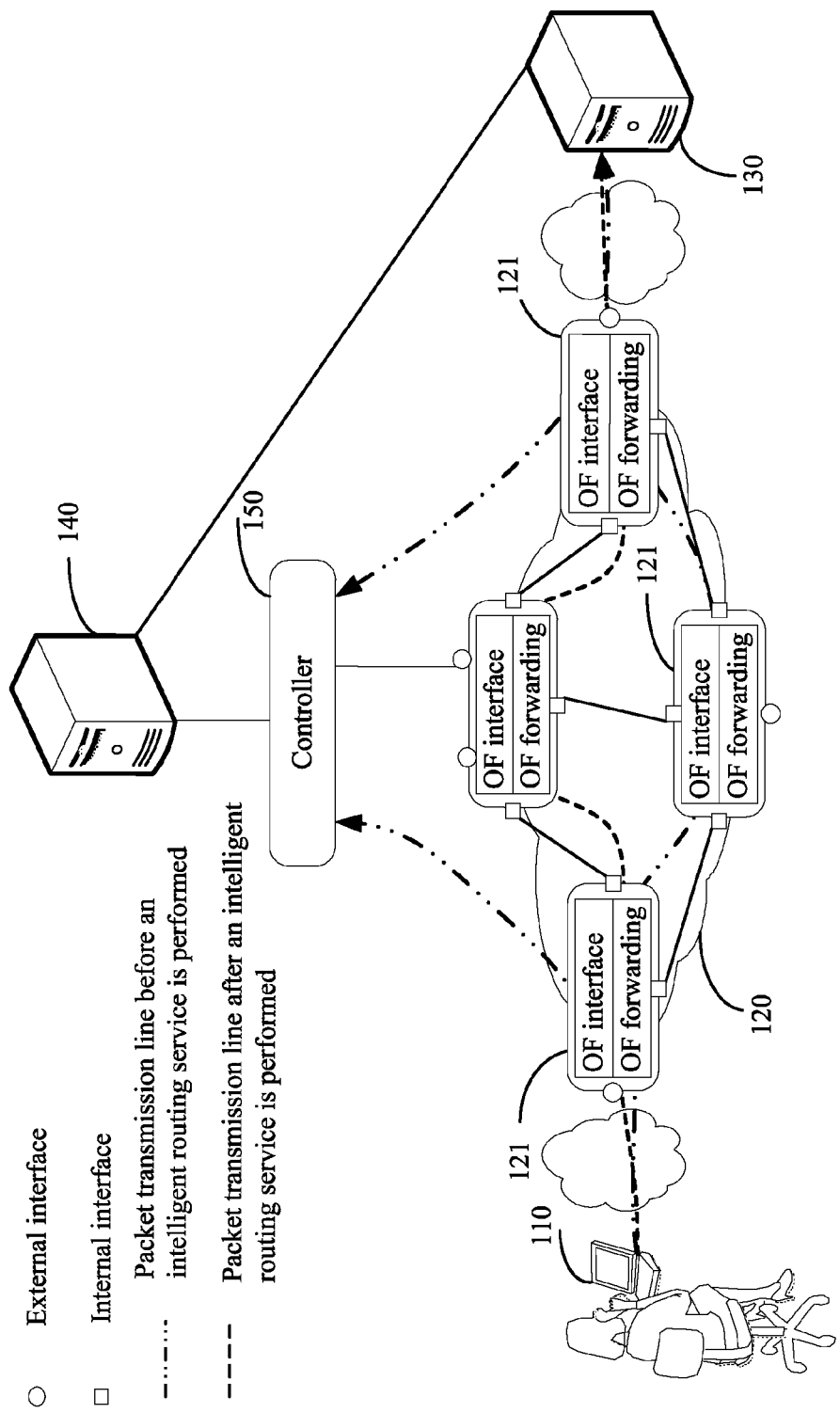
FIG. 5 is a schematic diagram of yet another embodiment of implementing an intelligent routing service by using the flow forwarding system shown in FIG. 1.

Referring to FIG. 5, FIG. 5 is a schematic diagram of yet another embodiment of implementing an intelligent routing service by using the flow forwarding system shown in FIG. 1.

In this embodiment, a controller delivers a first flow table entry to a hybrid forwarding device 121 as required, where the first flow table entry includes an action and characteristic information of an object that needs to perform an intelligent routing service, where the action is used to send a message to the controller, so that after a data flow with the characteristic information of the object that needs to perform the intelligent routing service enters an edge node, the edge node searches a flow table by using the characteristic information as an index. If a matching flow table entry is found, a packet is forwarded according to a traditional IP routing mode; in addition, a copy of the packet is mirrored.

In this embodiment, an operator has already predetermined an object that needs to perform an intelligent routing service, for example, a user is a VIP user, and therefore, a service flow of the user may obtain more bandwidth for data transmission. The operator sets, in an application server 130, characteristic information of a data flow for which an intelligent routing service needs to be performed, and therefore, the application server 130 sends, to a policy server 140, the characteristic information of the data flow for which the intelligent routing service needs to be performed and a constraint condition required for establishing the intelligent routing service.

The characteristic information includes at least one of the following in an intelligent routing service request packet: a source address, a destination address, a source port, a destination port, and a protocol number. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

The policy server 140 obtains, by means of parsing, the characteristic information of the data flow for which the intelligent routing service needs to be performed, obtains, by means of parsing according to the intelligent routing service request packet, the constraint condition required for establishing the intelligent routing service, generates a policy control factor, and encapsulates the characteristic information of the data flow of the intelligent routing service and the policy control factor in a control policy; and then sends the control policy to a controller 150. The controller 150 generates a first flow table according to the characteristic information of the data flow for which the intelligent routing service needs to be performed, and then the controller 150 separately sends the first flow table to each hybrid forwarding device 121.

A client 110 sends an intelligent routing service packet to the application server 130. As shown by a dot-dashed line in the figure, the intelligent routing service packet is sent to an edge node that is directly connected to the client 110. The edge node that is directly connected to the client 110 has already received the first flow table in this case, and characteristic information of the intelligent routing service packet is recorded in the first flow table; therefore, the edge node that is directly connected to the client 110 performs mirroring on the intelligent routing service packet so as to obtain a mirrored packet, and then the edge node encapsulates the mirrored packet in a first message and sends the first message to the controller 150. The first message includes the mirrored packet, identification information of the edge node, and interface attribute information of an interface that receives the intelligent routing service packet, and the mirrored packet includes the characteristic information of the intelligent routing service packet. The interface attribute information is used to indicate that the edge node is an ingress edge-node or an egress edge-node of the intelligent routing service packet in an SDN migration network.

In another embodiment, the characteristic information, the mirrored packet, the identification information of the edge node, and the interface attribute information of the interface that receives the service packet may be together included in the first message.

After receiving the first message, the controller 150 reads the characteristic information of the intelligent routing service request packet and the identification information of the edge node from the first message.

If the characteristic information further includes the application-aware type, the controller 150 needs to perform deep packet inspection on the packet, so as to determine whether the packet meets the application-aware type. If the packet meets the application-aware type, proceed with the following steps; if the packet does not meet the application-aware type, terminate the procedure; if the characteristic information does not include the application-aware type, perform the following steps directly.

The controller 150 forwards the intelligent routing service packet according to a traditional IP routing mode, so as to continue to send the intelligent routing service packet to the application server 130. A refined intelligent routing service flow forwarding path is not yet obtained in this case; therefore, according to a traditional forwarding manner of searching an IP routing table, the intelligent routing service packet is sent, after being forwarded by internal interfaces of a plurality of hybrid forwarding devices 121, to an edge node that is directly connected to the application server 130.

The edge node that is directly connected to the application server 130 has already received the first flow table in this case, and the characteristic information of the intelligent routing service packet is recorded in a first flow table entry; therefore, the edge node that is directly connected to the application server 130 performs mirroring on the intelligent routing service packet to obtain a mirrored packet, and the edge node encapsulates the mirrored packet in the first message and sends the first message to the controller 150. The first message includes the mirrored packet, the identification information of the edge node, and the interface attribute information of the interface that receives the service packet, and the mirrored packet includes the characteristic information of the intelligent routing service packet. In addition, on the other hand, the original intelligent routing service packet is forwarded according to the traditional IP routing mode, so as to continue to be sent to the application server 130 though an external interface of the edge node that is directly connected to the application server 130.

In another embodiment, the characteristic information, the mirrored packet, the identification information of the edge node, and the interface attribute information of the interface that receives the service packet may be together included in the first message. After receiving the first message, the controller 150 reads, from the first message, the characteristic information of the intelligent routing service packet, identification information of a second edge node, and the interface attribute information of the interface that receives the service packet. A first edge node and the second edge node are determined according to the interface attribute information. For example, specifically, an edge node that receives an intelligent routing service request packet from an external interface whose interface attribute information is that the packet is an uplink packet is the first edge node; and an edge node that sends an intelligent routing service request packet through an external interface whose interface attribute information is that the packet is a downlink packet is the second edge node. Herein, the edge node that is directly connected to the client 110 is the first edge node, and the edge node that is directly connected to the application server 130 is the second edge node.

In another embodiment, the controller determines, according to a sequence of receiving messages, that the first edge node is an ingress edge-node, and that the second edge node is an egress edge-node.

According to the characteristic information of the intelligent routing service packet, the controller 150 locally finds identification information of the first edge node, identification information of the second edge node, and the policy control factor that are associated with the characteristic information. Previously, the controller 150 has already received, in an IGP protocol snooping manner or the like, a topology connection diagram of the hybrid forwarding devices 121 in the SDN migration network 120. The controller 150 computes, according to the identification information of the first edge node, the identification information of the second edge node, the policy control factor, and the topology connection diagram of the hybrid forwarding devices 121 in the SDN migration network 120, an intelligent routing service flow forwarding path that meets a requirement of the client 110; and the controller 150 generates corresponding second flow tables for all nodes in the intelligent routing service flow forwarding path and sends the second flow tables respectively to all the nodes. In addition, after a second flow table is sent to the first edge node and the second edge node, the first edge node and the second edge node process the intelligent routing service packet according to a second flow table entry, and do not send a subsequent intelligent routing service packet to the controller 150 anymore, so as to reduce load on the controller 150.

After the intelligent routing service flow forwarding path is generated, as shown by a dashed line in the figure, a subsequent intelligent routing service packet sent by the client 110 is forwarded according to the intelligent routing service flow forwarding path after the subsequent intelligent routing service packet enters the SDN migration network 120, and finally, the subsequent intelligent routing service packet reaches the application server 130, thereby completing data transmission.

It may be understood that this embodiment has the following advantages of both mirroring a packet as required and a short response time. However, this embodiment is merely applicable to a scenario in which an object that needs to perform an intelligent routing service is known in advance.

Figure 6:
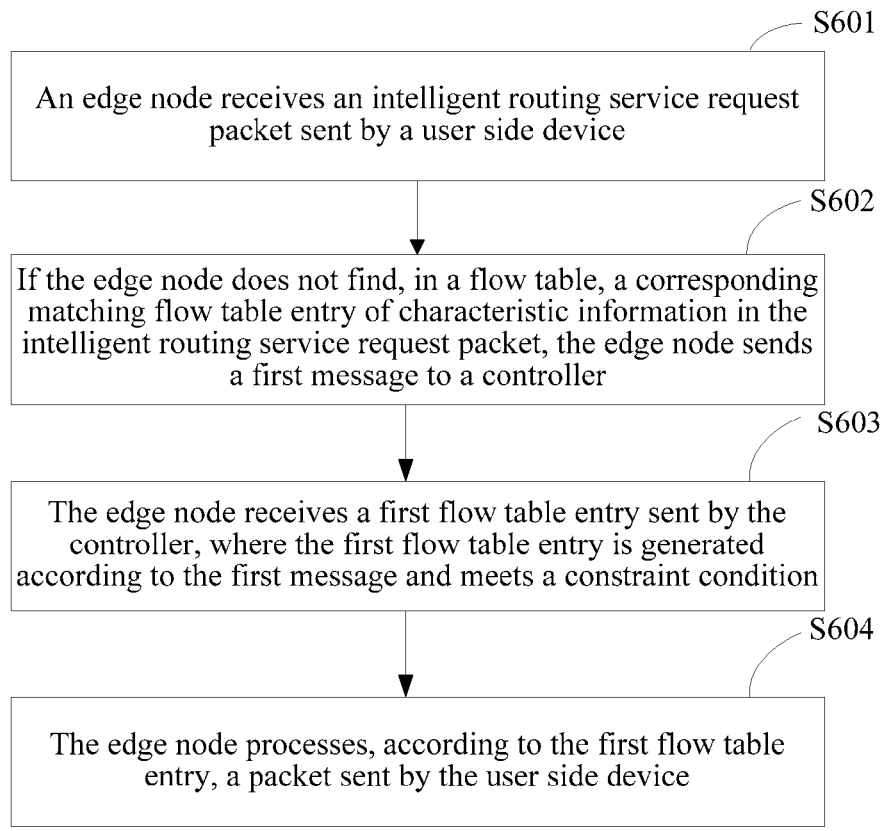
FIG. 6 is a flowchart of an embodiment of a flow forwarding method of the present application.

Referring to FIG. 6, FIG. 6 is a flowchart of an embodiment of a flow forwarding method of the present application. The flow forwarding method in this embodiment is applied to an (SDN migration network) SDN migration network and includes:

S601: An edge node receives an intelligent routing service request packet sent by a user side device, where the intelligent routing service request packet is used to request a service server to provide an intelligent routing service for the user side device, and the intelligent routing service request packet includes a constraint condition required for establishing the intelligent routing service.

Before the intelligent routing service is performed, a controller needs to first obtain characteristic information of a data flow for which the intelligent routing service needs to be performed and the constraint condition required for establishing the intelligent routing service.

The characteristic information includes at least one of the following in the intelligent routing service request packet: a source address, a destination address, a source port, a destination port, and a protocol number. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

When a user applies for the intelligent routing service, the user side device sends the intelligent routing service request packet, where the intelligent routing service request packet is used to request the service server to provide the intelligent routing service for the user side device, and the intelligent routing service request packet includes the characteristic information of the intelligent routing service request packet and the constraint condition required for establishing the intelligent routing service. The edge node receives the intelligent routing service request packet sent by the user side device.

S602: If the edge node does not find, in a flow table, a corresponding matching flow table entry of characteristic information in the intelligent routing service request packet, the edge node sends a first message to a controller, where the corresponding matching flow table entry includes the characteristic information, the first message includes identification information of the edge node and the characteristic information, and the edge node is an ingress edge-node or an egress edge-node that receives the intelligent routing service request packet in the SDN migration network.

If a data flow is a data flow for which an intelligent routing service request newly proposed, there is certainly no characteristic information, of the data flow, recorded in the edge node. Therefore, the edge node may be set in advance. An external interface of the edge node is set as follows: when the corresponding matching flow table entry of the characteristic information in the intelligent routing service request packet is not found in the flow table, the edge node sends the first message to the controller, where the first message includes the characteristic information and the identification information of the edge node; and an internal interface of the edge node is set as follows: even if the characteristic information is not found in the flow table, the characteristic information of the intelligent routing service request packet is not sent to the controller.

In this embodiment, the intelligent routing service request packet and the identification information of the edge node are encapsulated in the first message, and the intelligent routing service request packet includes the characteristic information. In another possible embodiment, the intelligent routing service request packet, the characteristic information of the intelligent routing service request packet, and the identification information of the edge node may be together encapsulated in the first message. For the two embodiments, the intelligent routing service request packet is sent to the controller. In order to continue packet transmission, the edge node further needs to receive a second message sent by the controller, where the second message includes the intelligent routing service request packet, so that the intelligent routing service request packet is returned to the edge node to continue packet transmission.

However, in still another possible embodiment, a mirrored packet of the intelligent routing service request packet and the identification information of the edge node are encapsulated in the first message. The mirrored packet of the intelligent routing service request packet is a duplicate packet of the intelligent routing service request packet. The intelligent routing service request packet includes the characteristic information, and therefore the mirrored packet also includes the characteristic information. In addition, in yet another possible embodiment, the mirrored packet, the characteristic information, and the identification information of the edge node may be together encapsulated in the first message.

The first message may further include interface attribute information of an interface that receives the intelligent routing service request packet, where the interface attribute information is used to indicate that the edge node is an ingress edge-node or an egress edge-node of the intelligent routing service request packet in an SDN migration network. Specifically, an edge node that receives an intelligent routing service request packet from an external interface whose interface attribute information is that the packet is an uplink packet is a first edge node (ingress edge-node); and an edge node that sends an intelligent routing service request packet through an external interface whose interface attribute information is that the packet is a downlink packet is a second edge node (egress edge-node).

In another embodiment, the controller may determine, according to a sequence of receiving messages, that the first edge node is an ingress edge-node, and that the second edge node is an egress edge-node.

If the edge node does not find, in the flow table, the corresponding matching flow table entry of the characteristic information in the intelligent routing service request packet, the edge node sends the first message to the controller.

Because an intelligent routing service flow forwarding path is not yet generated in this case, the edge node sends the intelligent routing service request packet according to a traditional IP routing mode.

S603: The edge node receives a first flow table entry sent by the controller, where the first flow table entry is generated according to the first message and meets the constraint condition.

After receiving the first message, the controller obtains the characteristic information, a first edge node identifier of the first edge node, and a second edge node identifier of the second edge node; and obtains, from the intelligent routing service request packet received by an application server, the constraint condition required for establishing the intelligent routing service, so as to further generate the first flow table entry, where the generated first flow table entry meets the constraint condition. The edge node receives the first flow table entry sent by the controller.

S604: The edge node processes, according to the first flow table entry, a packet sent by the user side device.

After the first flow table entry is generated, the intelligent routing service flow forwarding path has been established, and the edge node does not send the intelligent routing service request packet according to the traditional IP routing mode anymore, but processes, according to the first flow table entry, a packet sent by the user side device.

Figure 7:
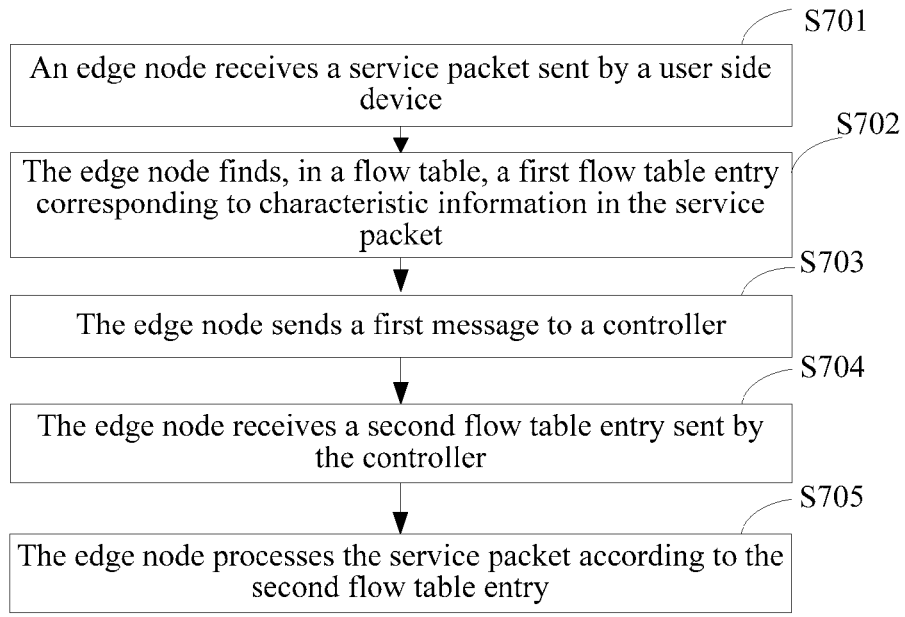
FIG. 7 is a flowchart of another embodiment of a flow forwarding method of the present application.

Referring to FIG. 7, FIG. 7 is a flowchart of another embodiment of a flow forwarding method of the present application. The flow forwarding method in this embodiment is applied to an SDN migration network and includes:

S701: An edge node receives a service packet sent by a user side device.

Before an intelligent routing service is performed, a controller needs to first obtain characteristic information of a data flow for which the intelligent routing service needs to be performed and a constraint condition required for establishing the intelligent routing service. When a user applies for the intelligent routing service, the user side device sends an intelligent routing service request packet, where the intelligent routing service request packet is used to request a service server to provide the intelligent routing service for the user side device, and the intelligent routing service request packet includes characteristic information of the intelligent routing service request packet and the constraint condition required for establishing the intelligent routing service.

The characteristic information includes at least one of the following in the intelligent routing service request packet: a source address, a destination address, a source port, a destination port, and a protocol number. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

In another embodiment, an operator has already known in advance the characteristic information of the data flow for which the intelligent routing service needs to be performed, and only the constraint condition required for establishing the intelligent routing service needs to be obtained by using the intelligent routing service request packet constraint condition.

After sending of the intelligent routing service request packet is completed, the user side device continues to send the service packet (or referred to as an intelligent routing service packet). The edge node receives the service packet sent by the user side device.

S702: The edge node finds, in a flow table, a first flow table entry corresponding to characteristic information in the service packet, where the first flow table entry includes an action, and the action is used to send a message to a controller; and the first flow table entry is generated by the controller according to an intelligent routing service request packet sent by the user side device or according to a preset object that needs to perform an intelligent routing service.

Because an application server has obtained the intelligent routing service request packet and has sent the characteristic information of the intelligent routing service request packet to the controller, the controller generates a first flow table according to the characteristic information and sends the first flow table to the edge node. Therefore, an external interface of the edge node may be preset as follows: when a corresponding matching flow table entry of the characteristic information in the intelligent routing service request packet is found in the flow table, the edge node sends a message to the controller, where the message includes identification information of the edge node and the characteristic information; and an internal interface of the edge node may be preset as follows: even if the characteristic information is found in the flow table, the characteristic information of the intelligent routing service request packet is not sent to the controller.

The edge node finds, in the flow table, the first flow table entry corresponding to the characteristic information in the service packet.

S703: The edge node sends a first message to the controller, where the first message includes the characteristic information, identification information of the edge node, and interface attribute information of an interface that receives the service packet, and the interface attribute information is used to indicate that the edge node is an ingress edge-node or an egress edge-node of the service packet in an SDN migration network.

When finding corresponding characteristic information in the first flow table entry, the edge node sends the first message to the controller.

In this embodiment, the first message includes a mirrored packet of the service packet, the identification information of the edge node, and the interface attribute information of the interface that receives the service packet, where the mirrored packet of the service packet is a duplicate packet of the service packet, so that if the service packet includes the characteristic information, the mirrored packet also includes the characteristic information. In another embodiment, the first message includes the characteristic information, the identification information of the edge node, the interface attribute information of the interface that receives the service packet, and the mirrored packet of the service packet. The interface attribute information is used to indicate that the edge node is an ingress edge-node or an egress edge-node of the intelligent routing service request packet in the SDN migration network. Specifically, an edge node that receives an intelligent routing service request packet from an external interface whose interface attribute information is that the packet is an uplink packet is a first edge node (ingress edge-node); and an edge node that sends an intelligent routing service request packet through an external interface whose interface attribute information is that the packet is a downlink packet is a second edge node (egress edge-node).

Because an intelligent routing service flow forwarding path is not yet generated in this case, after the edge node sends the first message to the controller, the edge node sends an intelligent routing service packet according to a traditional IP routing mode.

S704: The edge node receives a second flow table entry sent by the controller, where the second flow table entry meets a constraint condition in the intelligent routing service request packet.

After receiving the first message, the controller obtains the characteristic information, a first edge node identifier of the first edge node, and a second edge node identifier of the second edge node; and obtains, from the intelligent routing service request packet received by the application server, the constraint condition required for establishing the intelligent routing service so as to generate the second flow table entry, where the generated second flow table entry meets the constraint condition. The edge node receives the second flow table entry sent by the controller.

S705: The edge node processes the service packet according to the second flow table entry.

After the second flow table entry is generated, the intelligent routing service flow forwarding path has been established, and the edge node does not send the packet according to the traditional IP routing mode anymore, but processes, according to the second flow table entry, a packet sent by the user side device.

Figure 8:
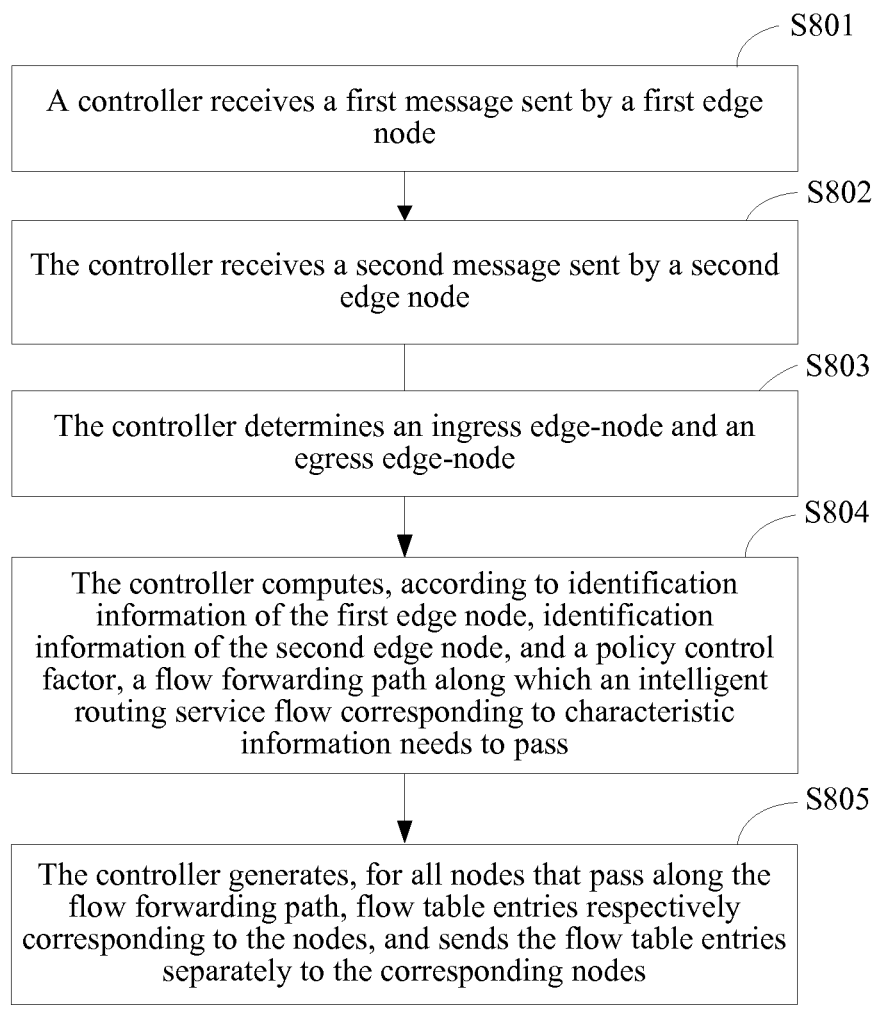
FIG. 8 is a flowchart of still another embodiment of a flow forwarding method of the present application.

Referring to FIG. 8, FIG. 8 is a flowchart of still another embodiment of a flow forwarding method of the present application. The flow forwarding method in this embodiment is applied to an SDN migration network and includes:

S801: A controller receives a first message sent by a first edge node, where the first message includes characteristic information of a packet sent by a user side device and identification information of the first edge node.

When the packet is a service packet, the first edge node and a second edge node do not know in which case the first message and a second message need to be sent. The controller sends a first flow table entry separately to the first edge node and the second edge node, so as to tell the first edge node and the second edge node when to send the messages. The first flow table entry includes an action, and the action is used to send a message to the controller; and the first flow table entry is generated by the controller according to an intelligent routing service request packet sent by the user side device or according to a preset object that needs to perform an intelligent routing service.

When the packet is a service packet and the characteristic information is not in a first flow table of the first edge node and a first flow table of the second edge node, the first edge node and the second edge node need to send the first message and the second message.

The first message further includes first interface attribute information of a first interface, of the first edge node, that receives the packet, and the first interface attribute information is used to indicate that the first edge node is an ingress edge-node of the packet in the SDN migration network.

S802: The controller receives a second message sent by a second edge node, where the second message includes identification information of the second edge node and the characteristic information.

The second message further includes second interface attribute information of a second interface, of the second edge node, that receives the packet, and the second interface attribute information is used to indicate that the second edge node is an egress node of the service packet in the SDN migration network.

S803: The controller determines that the first edge node is an ingress edge-node that receives the packet in the SDN migration network, and that the second edge node is an egress edge-node that receives the packet in the SDN migration network.

Specifically, an edge node that receives an intelligent routing service request packet from an external interface whose interface attribute information is that the packet is an uplink packet is an ingress edge-node; and an edge node that receives an intelligent routing service request packet from an external interface whose interface attribute information is that the packet is a downlink packet is an egress edge-node.

In another embodiment, the controller determines, according to a sequence of receiving the first message and the second message, that the first edge node is an ingress edge-node, and that the second edge node is an egress edge-node.

S804: The controller computes, according to the identification information of the first edge node, the identification information of the second edge node, and a policy control factor, a flow forwarding path along which an intelligent routing service flow corresponding to the characteristic information needs to pass. The policy control factor is determined according to a constraint condition in the intelligent routing service request packet sent by the user side device. The intelligent routing service request packet includes the characteristic information and the constraint condition, where the characteristic information is used to indicate those data flows, for which the intelligent routing service needs to be established, in various data flows. The characteristic information includes at least one of the following: a source address, a destination address, a source port, a destination port, a protocol number, and the like. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

If the characteristic information includes the application-aware type, before the step that the controller computes, according to the identification information of the first edge node, the identification information of the second edge node, and a policy control factor, a flow forwarding path along which an intelligent routing service flow corresponding to the characteristic information needs to pass, the method further includes: performing deep packet inspection on the packet, so as to determine whether the packet meets the application-aware type, where if the packet meets the application-aware type, proceed with the following steps; if the packet does not meet the application-aware type, terminate the following steps; if the characteristic information includes the application-aware type, no processing is to be performed.

The controller obtains, by means of parsing, the identification information of the first edge node, the identification information of the second edge node, and the characteristic information from the first message and the second message. The controller receives the policy control factor and the characteristic information that are sent by a policy server. The controller associates the identification information of the first edge node, the identification information of the second edge node, and the policy control factor according to the characteristic information. The controller computes, according to the identification information of the first edge node, the identification information of the second edge node, and the policy control factor, the flow forwarding path along which the intelligent routing service flow corresponding to the characteristic information needs to pass.

S805: The controller generates, for all nodes on the flow forwarding path, flow table entries respectively corresponding to the nodes, and sends the flow table entries separately to corresponding nodes.

The present application further provides a flow forwarding method, where the method is applied to an (SDN migration network) SDN migration network and the method includes:

A first edge node receives an intelligent routing service request packet sent by a user side device, where the intelligent routing service request packet is used to request a service server to provide an intelligent routing service for the user side device, and the intelligent routing service request packet includes a constraint condition required for establishing the intelligent routing service. A policy control factor is determined according to the constraint condition in the intelligent routing service request packet sent by the user side device. If the first edge node does not find, in a flow table, a corresponding matching flow table entry of characteristic information in the intelligent routing service request packet, the first edge node sends a first message to a controller, where the corresponding matching flow table entry includes the characteristic information, and the first message includes identification information of the first edge node and the characteristic information.

The controller receives the first message sent by the first edge node.

A second edge node receives the intelligent routing service request packet that is sent by the user side device and forwarded by the first edge node.

If the second edge node does not find, in the flow table, the corresponding matching flow table entry of the characteristic information in the intelligent routing service request packet, the second edge node sends a second message to the controller, where the corresponding matching flow table entry includes the characteristic information, and the second message includes identification information of the second edge node and the characteristic information.

The controller receives the second message sent by the second edge node.

The controller determines that the first edge node is an ingress edge-node that receives the packet in the SDN migration network, and that the second edge node is an egress edge-node that receives the packet in the SDN migration network.

The controller computes, according to the identification information of the first edge node, the identification information of the second edge node, and a policy control factor, a flow forwarding path along which an intelligent routing service flow corresponding to the characteristic information needs to pass, where the policy control factor is determined according to the constraint condition in the intelligent routing service request packet sent by the user side device. If the characteristic information includes an application-aware type, before the step that the controller computes, according to the identification information of the first edge node, the identification information of the second edge node, and a policy control factor, a flow forwarding path along which an intelligent routing service flow corresponding to the characteristic information needs to pass, the method further includes: performing deep packet inspection on the packet, so as to determine whether the packet meets the application-aware type, where if the packet meets the application-aware type, proceed with the following steps; if the packet does not meet the application-aware type, terminate the following steps; if the characteristic information includes the application-aware type, no processing is to be performed.

The controller generates, for all nodes on the flow forwarding path, flow table entries respectively corresponding to the nodes, and sends the flow table entries separately to corresponding nodes, where the nodes include the first edge node and the second edge node.

The first edge node and the second edge node receive the flow table entries sent by the controller.

The first edge node and the second edge node process, according to the flow table entries, a packet sent by the user side device.

For details, refer to FIG. 6, FIG. 8, and related descriptions thereof, and details are not described herein again.

The present application further provides a flow forwarding method, where the method is applied to an (SDN migration network) SDN migration network and the method includes:

A first edge node receives a service packet sent by a user side device, and the first edge node finds, in a flow table, a first flow table entry corresponding to characteristic information in the service packet, where the first flow table entry includes an action, and the action is used to send a message to the controller; and the first flow table entry is generated by the controller according to an intelligent routing service request packet sent by the user side device. The intelligent routing service request packet includes characteristic information and a constraint condition, where the characteristic information is used to indicate those data flows, for which an intelligent routing service needs to be established, in various data flows. The characteristic information includes at least one of the following: a source address, a destination address, a source port, a destination port, a protocol number, and the like. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

The first edge node sends a first message to the controller, where the first message includes the characteristic information, identification information of the first edge node, and interface attribute information of an interface that receives the service packet.

The controller receives the first message sent by the first edge node. If the characteristic information further includes the application-aware type, the controller performs deep packet inspection on the packet, so as to determine whether the packet meets the application-aware type, where if the packet meets the application-aware type, perform the following steps; if the packet does not meet the application-aware type, terminate the following steps; if the characteristic information includes the application-aware type, no processing is to be performed.

The second edge node receives the service packet that is sent by the user side device and forwarded by the first edge node, and the second edge node finds, in the flow table, the first flow table entry corresponding to the characteristic information in the service packet, where the first flow table entry includes the action, and the action is used to send a message to the controller.

The second edge node sends a second message to the controller, where the second message includes the characteristic information, the identification information of the second edge node, and interface attribute information of an interface that receives the service packet.

The controller receives the second message sent by the second edge node.

The controller determines that the first edge node is an ingress edge-node that receives the packet in the SDN migration network, and that the second edge node is an egress edge-node that receives the packet in the SDN migration network.

The controller computes, according to the identification information of the first edge node, the identification information of the second edge node, and a policy control factor, a flow forwarding path along which an intelligent routing service flow corresponding to the characteristic information needs to pass.

The controller generates, for all nodes on the flow forwarding path, second flow table entries respectively corresponding to the nodes, and sends the second flow table entries separately to corresponding nodes, where the policy control factor is determined according to the constraint condition in the intelligent routing service request packet sent by the user side device, and the nodes include the first edge node and the second edge node.

The first edge node and the second edge node receive the second flow table entries sent by the controller, where the second flow table entries meet the constraint condition in the intelligent routing service request packet.

The first edge node and the second edge node process the service packet according to the second flow table entry.

For details, refer to FIG. 7, FIG. 8, and related descriptions thereof, and details are not described herein again.

Figure 9:
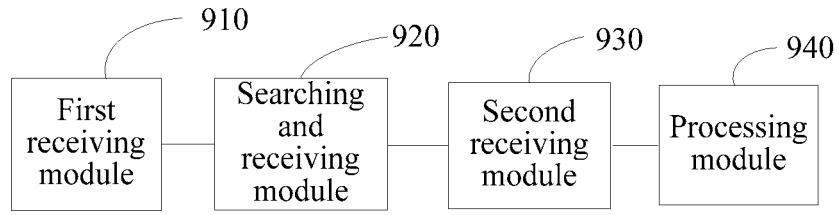
FIG. 9 is a schematic structural diagram of an embodiment of a hybrid forwarding device of the present application.

Referring to FIG. 9, FIG. 9 is a schematic structural diagram of an embodiment of a hybrid forwarding device of the present application. The hybrid forwarding device in this embodiment includes: a first receiving module 910, a searching and receiving module 920, a second receiving module 930, and a processing module 940.

The first receiving module 910 is configured to receive an intelligent routing service request packet sent by a user side device, where the intelligent routing service request packet is used to request a service server to provide an intelligent routing service for the user side device, and the intelligent routing service request packet includes a constraint condition required for establishing the intelligent routing service.

The intelligent routing service request packet includes characteristic information and the constraint condition, where the characteristic information is used to indicate those data flows, for which the intelligent routing service needs to be established, in various data flows. The characteristic information includes at least one of the following: a source address, a destination address, a source port, a destination port, a protocol number, and the like. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

For example, before the intelligent routing service is performed, a controller needs to first obtain characteristic information of a data flow for which the intelligent routing service needs to be performed and the constraint condition required for establishing the intelligent routing service. When a user applies for the intelligent routing service, the user side device sends the intelligent routing service request packet, where the intelligent routing service request packet is used to request the service server to provide the intelligent routing service for the user side device, and the intelligent routing service request packet includes the characteristic information of the intelligent routing service request packet and the constraint condition required for establishing the intelligent routing service. The first receiving module 910 receives the intelligent routing service request packet sent by the user side device.

The first receiving module 910 sends the intelligent routing service request packet to the searching and receiving module 920.

The searching and receiving module 920 is configured to receive the intelligent routing service request packet, where when an edge node does not find, in a flow table, a corresponding matching flow table entry of characteristic information in the intelligent routing service request packet, the edge node sends a first message to a controller, where the corresponding matching flow table entry includes the characteristic information, the first message includes identification information of the edge node and the characteristic information, and the edge node is an ingress edge-node or an egress edge-node that receives the intelligent routing service request packet in an SDN migration network.

For example, if a data flow is a data flow for which an intelligent routing service request is newly proposed, there is certainly no characteristic information, of the data flow, recorded in the edge node. Therefore, the edge node may be set in advance. An external interface of the edge node is set as follows: when the corresponding matching flow table entry of the characteristic information in the intelligent routing service request packet is not found in the flow table, the edge node sends the first message to the controller, where the first message includes the identification information of the edge node and the characteristic information; and an internal interface of the edge node is set as follows: even if the characteristic information is not found in the flow table, the characteristic information of the intelligent routing service request packet is not sent to the controller.

In this embodiment, the intelligent routing service request packet and the identification information of the edge node are encapsulated in the first message, and the intelligent routing service request packet includes the characteristic information. In another possible embodiment, the intelligent routing service request packet, the characteristic information of the intelligent routing service request packet, and the identification information of the edge node may be together encapsulated in the first message. For the two embodiments, the intelligent routing service request packet is sent to the controller. In order to continue packet transmission, the edge node further needs to receive a second message sent by the controller, where the second message includes the intelligent routing service request packet, so that the intelligent routing service request packet is returned to the edge node to continue packet transmission.

However, in still another possible embodiment, a mirrored packet of the intelligent routing service request packet and the identification information of the edge node are encapsulated in the first message. The mirrored packet of the intelligent routing service request packet is a duplicate packet of the intelligent routing service request packet. The intelligent routing service request packet includes the characteristic information, and therefore the mirrored packet also includes the characteristic information. In addition, in yet another possible embodiment, the mirrored packet, the characteristic information, and the identification information of the edge node may be together encapsulated in the first message.

The first message may further include interface attribute information of an interface that receives the intelligent routing service request packet, where the interface attribute information is used to indicate that the edge node is an ingress edge-node or an egress edge-node of the intelligent routing service request packet in an SDN migration network. Specifically, an edge node that receives an intelligent routing service request packet from an external interface whose interface attribute information is that the packet is an uplink packet is a first edge node (ingress edge-node); and an edge node that sends an intelligent routing service request packet through an external interface whose interface attribute information is that the packet is a downlink packet is a second edge node (egress edge-node).

In another embodiment, the controller may determine, according to a sequence of receiving messages, that the first edge node is an ingress edge-node, and that the second edge node is an egress edge-node.

Because an intelligent routing service flow forwarding path is not yet generated in this case, the processing module 940 sends the intelligent routing service request packet according to a traditional IP routing mode.

The second receiving module 930 is configured to receive a first flow table entry sent by the controller, where the first flow table entry is generated according to the first message and meets the constraint condition.

For example, after receiving the first message, the controller obtains the characteristic information, a first edge node identifier of the first edge node, and a second edge node identifier of the second edge node; and obtains, from the intelligent routing service request packet received by an application server, the constraint condition required for establishing the intelligent routing service so as to generate the first flow table entry, where the generated first flow table entry meets the constraint condition. The second receiving module 930 receives the first flow table entry sent by the controller.

The second receiving module 930 sends the first flow table entry to the processing module 940.

The processing module 940 is configured to receive the first flow table entry and process, according to the first flow table entry, a packet sent by the user side device.

For example, after the first flow table entry is generated, the intelligent routing service flow forwarding path has been established, and the processing module 940 does not send the intelligent routing service request packet according to the traditional IP routing mode anymore, but processes, according to the first flow table entry, a packet sent by the user side device.

In another embodiment, the device further includes a third receiving module, where the third receiving module receives the second message sent by the controller, and the second message includes the intelligent routing service request packet; and the processing module 940 sends the intelligent routing service request packet according to the traditional IP routing mode.

Figure 10:
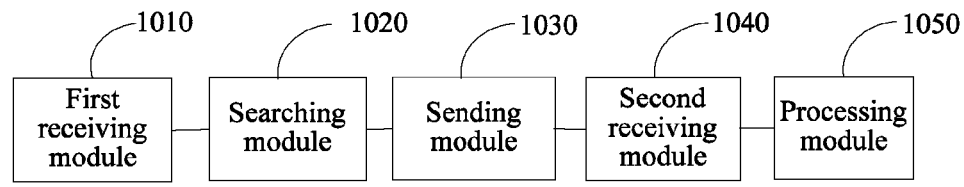
FIG. 10 is a schematic structural diagram of another embodiment of a hybrid forwarding device of the present application.

Referring to FIG. 10, FIG. 10 is a schematic structural diagram of another embodiment of a hybrid forwarding device of the present application. The hybrid forwarding device in this embodiment includes: a first receiving module 1010, a searching module 1020, a sending module 1030, a second receiving module 1040, and a processing module 1050.

The first receiving module 1010 is configured to receive a service packet sent by a user side device.

For example, before an intelligent routing service is performed, a controller needs to first obtain characteristic information of a data flow for which the intelligent routing service needs to be performed and a constraint condition required for establishing the intelligent routing service. When a user applies for the intelligent routing service, the user side device sends an intelligent routing service request packet, where the intelligent routing service request packet is used to request a service server to provide the intelligent routing service for the user side device, and the intelligent routing service request packet includes characteristic information of the intelligent routing service request packet and the constraint condition required for establishing the intelligent routing service.

The intelligent routing service request packet includes the characteristic information and the constraint condition, where the characteristic information is used to indicate those data flows, for which the intelligent routing service needs to be established, in various data flows. The characteristic information includes at least one of the following: a source address, a destination address, a source port, a destination port, a protocol number, and the like. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

In another embodiment, an operator has already known in advance the characteristic information of the data flow for which the intelligent routing service needs to be performed; and therefore only needs to obtain, by using the intelligent routing service request packet, the constraint condition required for establishing the intelligent routing service.

After sending of the intelligent routing service request packet is completed, the user side device continues to send a service packet (or referred to as an intelligent routing service packet). The first receiving module 1010 receives the service packet sent by the user side device.

The first receiving module 1010 sends the service packet to the searching module 1020.

The searching module 1020 is configured to receive the service packet and find, in a flow table, a first flow table entry corresponding to characteristic information in the service packet, where the first flow table entry includes an action, and the action is used to send a message to the controller; the first flow table entry is generated by the controller according to the intelligent routing service request packet sent by the user side device or according to a preset object that needs to perform the intelligent routing service.

For example, because an application server has obtained the intelligent routing service request packet and has sent the characteristic information of the intelligent routing service request packet to the controller, the controller generates a first flow table according to the characteristic information and sends the first flow table to an edge node. Therefore, an external interface of the edge node may be preset as follows: when a corresponding matching flow table entry of the characteristic information in the intelligent routing service request packet is found in the flow table, the edge node sends a message to the controller, where the message includes identification information of the edge node and the characteristic information; and an internal interface of the edge node may be preset as follows: even if the characteristic information is found in the flow table, the characteristic information of the intelligent routing service request packet is not sent to the controller. The searching module 1020 finds, in the flow table, the first flow table entry corresponding to the characteristic information in the service packet.

The searching module 1020 sends a finding result to the sending module 1030.

The sending module 1030 is configured to receive the finding result and send a first message to the controller, where the first message includes the characteristic information, identification information of an edge node, and interface attribute information of an interface that receives the service packet, and the interface attribute information is used to indicate that the edge node is an ingress edge-node or an egress edge-node of the service packet in an SDN migration network.

For example, when finding corresponding characteristic information in the first flow table entry, the sending module 1030 sends the first message to the controller.

In this embodiment, the first message includes a mirrored packet of the service packet, the identification information of the edge node, and the interface attribute information of the interface that receives the service packet, where the mirrored packet of the service packet is a duplicate packet of the service packet, so that if the service packet includes the characteristic information, the mirrored packet also includes the characteristic information. In another embodiment, the first message includes the characteristic information, the identification information of the edge node, the interface attribute information of the interface that receives the service packet, and the mirrored packet of the service packet. The interface attribute information is used to indicate that the edge node is an ingress edge-node or an egress edge-node of the intelligent routing service request packet in the SDN migration network. Specifically, an edge node that receives an intelligent routing service request packet from an external interface whose interface attribute information is that the packet is an uplink packet is a first edge node (ingress edge-node); and an edge node that sends an intelligent routing service request packet through an external interface whose interface attribute information is that the packet is a downlink packet is a second edge node (egress edge-node).

Because an intelligent routing service flow forwarding path is not yet generated in this case, after the edge node sends the first message to the controller, the processing module 1050 sends the intelligent routing service packet according to a traditional IP routing mode.

The second receiving module 1040 is configured to receive a second flow table entry sent by the controller, where the second flow table entry meets the constraint condition in the intelligent routing service request packet.

For example, after receiving the first message, the controller obtains the characteristic information, a first edge node identifier of the first edge node, and a second edge node identifier of the second edge node; and obtains, from the intelligent routing service request packet received by the application server, the constraint condition required for establishing the intelligent routing service so as to generate the second flow table entry, where the generated second flow table entry meets the constraint condition. The second receiving module 1040 receives the second flow table entry sent by the controller.

The second receiving module 1040 sends the second flow table entry to the processing module 1050.

The processing module 1040 is configured to receive the second flow table entry and process the service packet according to the second flow table entry.

For example, after the second flow table entry is generated, the intelligent routing service flow forwarding path has been established, and the processing module 1040 does not send the packet according to the traditional IP routing mode anymore, but processes, according to the second flow table entry, a packet sent by the user side device.

Figure 11:
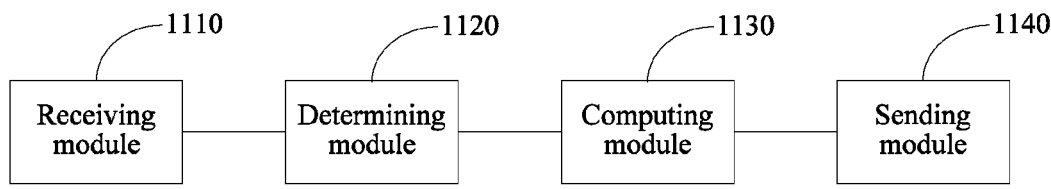
FIG. 11 is a schematic structural diagram of an embodiment of a controller of the present application.

Referring to FIG. 11, FIG. 11 is a schematic structural diagram of an embodiment of a controller of the present application. The controller in this embodiment includes: a receiving module 1110, a determining module 1120, a computing module 1130, and a sending module 1140.

The receiving module 1110 is configured to receive a first message sent by a first edge node, and receive a second message sent by a second edge node, where the first message includes characteristic information of a packet sent by a user side device and identification information of the first edge node, and the second message includes identification information of the second edge node and the characteristic information.

For example, when the packet is a service packet, the first edge node and the second edge node do not know in which case the first message and the second message need to be sent. The controller sends a first flow table entry separately to the first edge node and the second edge node, so as to tell the first edge node and the second edge node when to send the messages. The first flow table entry includes an action, and the action is used to send a message to the controller; and the first flow table entry is generated by the controller according to an intelligent routing service request packet sent by the user side device or according to a preset object that needs to perform an intelligent routing service.

When the packet is a service packet and the characteristic information is not in a first flow table of the first edge node and a first flow table of the second edge node, the first edge node and the second edge node need to send the first message and the second message.

The first message further includes first interface attribute information of a first interface, of the first edge node, that receives the packet, and the first interface attribute information is used to indicate that the first edge node is an ingress edge-node of the packet in an SDN migration network.

The second message further includes second interface attribute information of a second interface, of the second edge node, that receives the packet, and the second interface attribute information is used to indicate that the second edge node is an egress node of the service packet in the SDN migration network.

After receiving the packet, the receiving module 1110 receives the first message sent by the first edge node.

The receiving module 1110 sends the first message and the second message to the determining module 1120.

The determining module 1120 is configured to determine that the first edge node is an ingress edge-node that receives the packet in the SDN migration network, and that the second edge node is an egress edge-node that receives the packet in the SDN migration network.

For example, specifically, the determining module 1120 determines that: an edge node that receives an intelligent routing service request packet from an external interface whose interface attribute information is that the packet is an uplink packet is an ingress edge-node; and an edge node that receives an intelligent routing service request packet from an external interface whose interface attribute information is that the packet is a downlink packet is an egress edge-node.

In another embodiment, the determining module 1120 determines, according to a sequence of receiving the first message and the second message, that the first edge node is an ingress edge-node, and that the second edge node is an egress edge-node.

The determining module 1120 sends a determining result to the computing module 1130.

The computing module 1130 is configured to receive the determining result, and generate, for all nodes on a flow forwarding path, flow table entries respectively corresponding to the nodes.

The sending module 1140 is configured to send the flow table entries separately to corresponding nodes, where a policy control factor is determined according to a constraint condition in the intelligent routing service request packet sent by the user side device. The sending module 1140 is further configured to, when the packet is a service packet, send a first flow table entry separately to the first edge node and the second edge node, where the first flow table entry includes an action, and the action is used to send a message to the controller; and the first flow table entry is generated by the controller according to the intelligent routing service request packet sent by the user side device.

The intelligent routing service request packet includes the characteristic information and the constraint condition, where the characteristic information is used to indicate those data flows, for which the intelligent routing service needs to be established, in various data flows. The characteristic information includes at least one of the following: a source address, a destination address, a source port, a destination port, a protocol number, and the like. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

If the characteristic information includes the application-aware type, the controller further includes a deep packet inspection module, where the deep packet inspection module is configured to perform deep packet inspection on the packet so as to determine whether the packet meets the application-aware type.

In another embodiment, the receiving module 1110 is further configured to receive the policy control factor and the characteristic information that are sent by a policy server.

Figure 12:
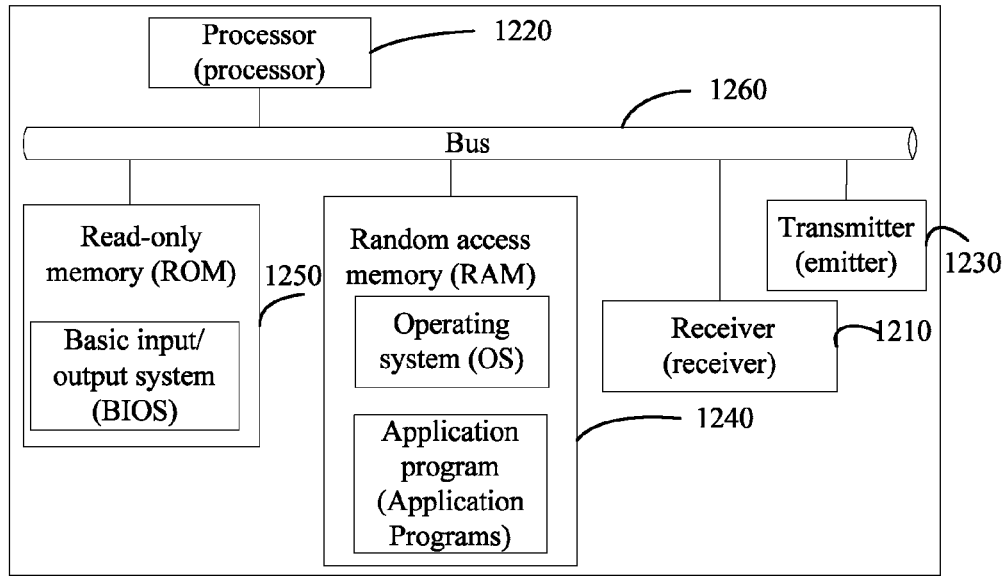
FIG. 12 is a schematic structural diagram of still another embodiment of a hybrid forwarding device of the present application.

Referring to FIG. 12, FIG. 12 is a schematic structural diagram of still another embodiment of a hybrid forwarding device of the present application. The hybrid forwarding device in this embodiment includes: a receiver 1210, a processor 1220, a transmitter 1230, a random access memory 1240, a read-only memory 1250, and a bus 1260. The processor 1220 is coupled separately to the receiver 1210, the transmitter 1230, the random access memory 1240, and the read-only memory 1250 by using the bus 1260. When it is required to run the hybrid forwarding device, a permanent bootloader in a basic input/output system or an embedded system of the read-only memory 1250 instructs a system to start up, so that the hybrid forwarding device enters a normal running state. After the hybrid forwarding device enters the normal running state, an application program and an operating system run in the random access memory 1240, so that:

the receiver 1210 is configured to receive an intelligent routing service request packet sent by a user side device, where the intelligent routing service request packet is used to request a service server to provide an intelligent routing service for the user side device, and the intelligent routing service request packet includes a constraint condition required for establishing the intelligent routing service. A policy control factor is determined according to the constraint condition in the intelligent routing service request packet sent by the user side device.

The intelligent routing service request packet includes characteristic information and the constraint condition, where the characteristic information is used to indicate those data flows, for which the intelligent routing service needs to be established, in various data flows. The characteristic information includes at least one of the following: a source address, a destination address, a source port, a destination port, a protocol number, and the like. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

For example, before the intelligent routing service is performed, a controller needs to first obtain characteristic information of a data flow for which the intelligent routing service needs to be performed and the constraint condition required for establishing the intelligent routing service. When a user applies for the intelligent routing service, the user side device sends the intelligent routing service request packet, where the intelligent routing service request packet is used to request the service server to provide the intelligent routing service for the user side device, and the intelligent routing service request packet includes the characteristic information of the intelligent routing service request packet and the constraint condition required for establishing the intelligent routing service. The receiver 1210 receives the intelligent routing service request packet sent by the user side device.

The processor 1220 is configured to receive the intelligent routing service request packet. When an edge node does not find, in a flow table, a corresponding matching flow table entry of the characteristic information in the intelligent routing service request packet, the transmitter 1230 sends a first message to the controller, where the corresponding matching flow table entry includes the characteristic information, the first message includes identification information of the edge node and the characteristic information, and the edge node is an ingress edge-node or an egress edge-node that receives the intelligent routing service request packet in an SDN migration network.

For example, if a data flow is a data flow for which an intelligent routing service request is newly proposed, there is certainly no characteristic information, of the data flow, recorded in the edge node. Therefore, the edge node may be set in advance. An external interface of the edge node is set as follows: when the corresponding matching flow table entry of the characteristic information in the intelligent routing service request packet is not found in the flow table, the edge node sends the first message to the controller, where the first message includes the characteristic information and the identification information of the edge node; and an internal interface of the edge node is set as follows: even if the characteristic information is not found in the flow table, the characteristic information of the intelligent routing service request packet is not sent to the controller.

In this embodiment, the intelligent routing service request packet and the identification information of the edge node are encapsulated in the first message, and the intelligent routing service request packet includes the characteristic information. In another possible embodiment, the intelligent routing service request packet, the characteristic information of the intelligent routing service request packet, and the identification information of the edge node may be together encapsulated in the first message. For the two embodiments, the intelligent routing service request packet is sent to the controller. In order to continue packet transmission, the edge node further needs to receive a second message sent by the controller, where the second message includes the intelligent routing service request packet, so that the intelligent routing service request packet is returned to the edge node to continue packet transmission.

However, in still another possible embodiment, a mirrored packet of the intelligent routing service request packet and the identification information of the edge node are encapsulated in the first message. The mirrored packet of the intelligent routing service request packet is a duplicate packet of the intelligent routing service request packet. The intelligent routing service request packet includes the characteristic information, and therefore the mirrored packet also includes the characteristic information. In addition, in yet another possible embodiment, the mirrored packet, the characteristic information, and the identification information of the edge node may be together encapsulated in the first message.

The first message may further include interface attribute information of an interface that receives the intelligent routing service request packet, where the interface attribute information is used to indicate that the edge node is an ingress edge-node or an egress edge-node of the intelligent routing service request packet in the SDN migration network. Specifically, an edge node that receives an intelligent routing service request packet from an external interface whose interface attribute information is that the packet is an uplink packet is a first edge node (ingress edge-node); and an edge node that sends an intelligent routing service request packet through an external interface whose interface attribute information is that the packet is a downlink packet is a second edge node (egress edge-node).

In another embodiment, the controller may determine, according to a sequence of receiving messages, that the first edge node is an ingress edge-node, and that the second edge node is an egress edge-node.

Because an intelligent routing service flow forwarding path is not yet generated in this case, the processing module 1220 sends the intelligent routing service request packet according to a traditional IP routing mode.

The receiver 1210 is further configured to receive a first flow table entry sent by the controller, where the first flow table entry is generated according to the first message and meets the constraint condition.

For example, after receiving the first message, the controller obtains the characteristic information, a first edge node identifier of the first edge node, and a second edge node identifier of the second edge node; and obtains, from the intelligent routing service request packet received by an application server, the constraint condition required for establishing the intelligent routing service so as to generate the first flow table entry, where the generated first flow table entry meets the constraint condition. The receiver 1210 receives the first flow table entry sent by the controller.

The processor 1220 is configured to receive the first flow table entry and process, according to the first flow table entry, a packet sent by the user side device.

For example, after the first flow table entry is generated, the intelligent routing service flow forwarding path has been established, and the processor 1220 does not send the intelligent routing service request packet according to the traditional IP routing mode anymore, but processes, according to the first flow table entry, a packet sent by the user side device.

In another embodiment, the receiver 1210 is further configured to receive a second message sent by the controller, where the second message includes the intelligent routing service request packet; and the processing module 1220 sends the intelligent routing service request packet according to the traditional IP routing mode.

Figure 13:
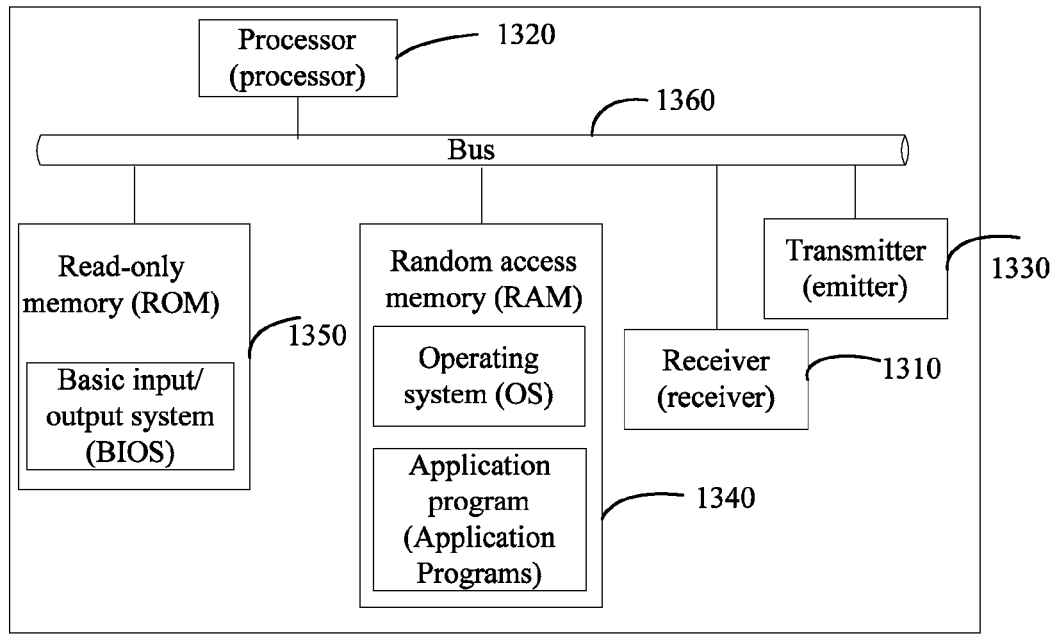
FIG. 13 is a schematic structural diagram of yet another embodiment of a hybrid forwarding device of the present application.

Referring to FIG. 13, FIG. 13 is a schematic structural diagram of yet another embodiment of a hybrid forwarding device of the present application. The hybrid forwarding device in this embodiment includes: a receiver 1310, a processor 1320, a transmitter 1330, a random access memory 1340, a read-only memory 1350, and a bus 1360. The processor 1320 is coupled separately to the receiver 1310, the transmitter 1330, the random access memory 1340, and the read-only memory 1350 by using the bus 1360. When it is required to run the hybrid forwarding device, a permanent bootloader in a basic input/output system or an embedded system of the read-only memory 1350 is used to instruct a system to start up, so that the hybrid forwarding device enters a normal running state. After the hybrid forwarding device enters the normal running state, an application program and an operating system run in the random access memory 1340, so that:

the receiver 1310 is configured to receive a service packet sent by a user side device.

For example, before an intelligent routing service is performed, a controller needs to first obtain characteristic information of a data flow for which the intelligent routing service needs to be performed and a constraint condition required for establishing the intelligent routing service. When a user applies for the intelligent routing service, the user side device sends an intelligent routing service request packet, where the intelligent routing service request packet is used to request a service server to provide the intelligent routing service for the user side device, and the intelligent routing service request packet includes characteristic information of the intelligent routing service request packet and the constraint condition required for establishing the intelligent routing service.

The characteristic information is used to indicate those data flows, for which the intelligent routing service needs to be established, in various data flows. The characteristic information includes at least one of the following: a source address, a destination address, a source port, a destination port, a protocol number, and the like. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

In another embodiment, an operator has already known in advance the characteristic information of the data flow for which the intelligent routing service needs to be performed; and therefore only needs to obtain, by using the intelligent routing service request packet, the constraint condition required for establishing the intelligent routing service.

After sending of the intelligent routing service request packet is completed, the user side device continues to send a service packet (or referred to as an intelligent routing service packet). The receiver 1310 receives the service packet sent by the user side device.

The processor 1320 is configured to receive the service packet and find, in a flow table, a first flow table entry corresponding to characteristic information in the service packet, where the first flow table entry includes an action, and the action is used to send a message to the controller; the first flow table entry is generated by the controller according to the intelligent routing service request packet sent by the user side device or according to a preset object that needs to perform the intelligent routing service.

For example, because an application server has obtained the intelligent routing service request packet and has sent the characteristic information of the intelligent routing service request packet to the controller, the controller generates a first flow table according to the characteristic information and sends the first flow table to an edge node. Therefore, an external interface of the edge node may be preset as follows: when a corresponding matching flow table entry of the characteristic information in the intelligent routing service request packet is found in the flow table, the edge node sends a message to the controller, where the message includes identification information of the edge node and the characteristic information; and an internal interface of the edge node may be preset as follows: even if the characteristic information is found in the flow table, the characteristic information of the intelligent routing service request packet is not sent to the controller. The processor 1320 finds, in the flow table, the first flow table entry corresponding to the characteristic information in the service packet.

The transmitter 1330 is configured to receive the finding result and send a first message to the controller, where the first message includes the characteristic information, the identification information of the edge node, and interface attribute information of an interface that receives the service packet, and the interface attribute information is used to indicate that the edge node is an ingress edge-node or an egress edge-node of the service packet in an SDN migration network.

For example, when corresponding characteristic information is found in the first flow table entry, the transmitter 1330 sends the first message to the controller.

In this embodiment, the first message includes a mirrored packet of the service packet, the identification information of the edge node, and the interface attribute information of the interface that receives the service packet, where the mirrored packet of the service packet is a duplicate packet of the service packet, so that if the service packet includes the characteristic information, the mirrored packet also includes the characteristic information. In another embodiment, the first message includes the characteristic information, the identification information of the edge node, the interface attribute information of the interface that receives the service packet, and the mirrored packet of the service packet.

The interface attribute information is used to indicate that the edge node is an ingress edge-node or an egress edge-node of the intelligent routing service request packet in the SDN migration network. Specifically, an edge node that receives an intelligent routing service request packet from an external interface whose interface attribute information is that the packet is an uplink packet is a first edge node (ingress edge-node); and an edge node that sends an intelligent routing service request packet through an external interface whose interface attribute information is that the packet is a downlink packet is a second edge node (egress edge-node).

Because an intelligent routing service flow forwarding path is not yet generated in this case, after the edge node sends the first message to the controller, the transmitter 1330 sends the intelligent routing service packet according to a traditional IP routing mode.

The receiver 1310 is further configured to receive a second flow table entry sent by the controller, where the second flow table entry meets the constraint condition in the intelligent routing service request packet.

For example, after receiving the first message, the controller obtains the characteristic information, a first edge node identifier of the first edge node, and a second edge node identifier of the second edge node; and obtains, from the intelligent routing service request packet received by the application server, the constraint condition required for establishing the intelligent routing service so as to generate the second flow table entry, where the generated second flow table entry meets the constraint condition. The receiver 1310 receives the second flow table entry sent by the controller.

The processor 1320 is configured to receive the second flow table entry and process the service packet according to the second flow table entry.

For example, after the second flow table entry is generated, the intelligent routing service flow forwarding path has been established, and the processor 1320 does not send the packet according to the traditional IP routing mode anymore, but processes, according to the second flow table entry, the packet sent by the user side device.

Figure 14:
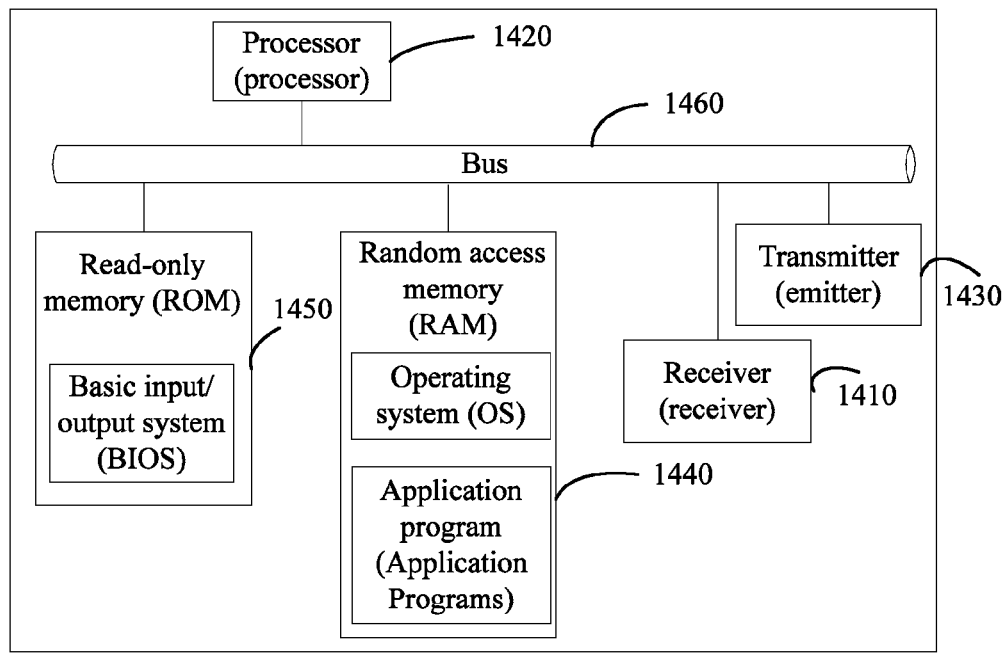
FIG. 14 is a schematic structural diagram of another embodiment of a controller of the present application.

Referring to FIG. 14, FIG. 14 is a schematic structural diagram of another embodiment of a controller of the present application. The controller in this embodiment includes: a receiver 1410, a processor 1420, a transmitter 1430, a random access memory 1440, a read-only memory 1450, and a bus 1460. The processor 1420 is coupled separately to the receiver 1410, the transmitter 1430, the random access memory 1440, and the read-only memory 1450 by using the bus 1460. When it is required to run the controller, a permanent bootloader in a basic input/output system or an embedded system of the read-only memory 1450 instructs a system to start up, so that the controller enters a normal running state. After the controller enters the normal running state, an application program and an operating system run in the random access memory 1440, so that:

the receiver 1410 is configured to receive a first message sent by a first edge node, and receive a second message sent by a second edge node, where the first message includes characteristic information of a packet sent by a user side device and identification information of the first edge node, and the second message includes identification information of the second edge node and the characteristic information.

For example, when the packet is a service packet, the first edge node and the second edge node do not know in which case the first message and the second message need to be sent. The controller sends a first flow table entry separately to the first edge node and the second edge node, so as to tell the first edge node and the second edge node when to send the messages. The first flow table entry includes an action, and the action is used to send a message to the controller; and the first flow table entry is generated by the controller according to an intelligent routing service request packet sent by the user side device or according to a preset object that needs to perform an intelligent routing service.

When the packet is a service packet and the characteristic information is not in a first flow table of the first edge node and a first flow table of the second edge node, the first edge node and the second edge node need to send the first message and the second message.

The first message further includes first interface attribute information of a first interface, of the first edge node, that receives the packet, and the first interface attribute information is used to indicate that the first edge node is an ingress edge-node of the packet in an SDN migration network.

The second message further includes second interface attribute information of a second interface, of the second edge node, that receives the packet, and the second interface attribute information is used to indicate that the second edge node is an egress node of the service packet in the SDN migration network.

After receiving the packet, the receiver 1410 receives the first message sent by the first edge node.

The processor 1420 is configured to determine that the first edge node is an ingress edge-node that receives the packet in the SDN migration network, and that the second edge node is an egress edge-node that receives the packet in the SDN migration network.

For example, specifically, the processor 1420 determines that: an edge node that receives an intelligent routing service request packet from an external interface whose interface attribute information is that the packet is an uplink packet is an ingress edge-node; and an edge node that receives an intelligent routing service request packet from an external interface whose interface attribute information is that the packet is a downlink packet is an egress edge-node.

In another embodiment, the processor 1420 determines, according to a sequence of receiving the first message and the second message, that the first edge node is an ingress edge-node, and that the second edge node is an egress edge-node.

The processor 1420 is further configured to receive the determining result, and generate, for all nodes on a flow forwarding path, flow table entries respectively corresponding to the nodes.

The transmitter 1430 is configured to send the flow table entries separately to corresponding nodes, where a policy control factor is determined according to a constraint condition in the intelligent routing service request packet sent by the user side device. The transmitter 1430 is further configured to, when the packet is a service packet, send a first flow table entry separately to the first edge node and the second edge node, where the first flow table entry includes an action, and the action is used to send a message to the controller; and the first flow table entry is generated by the controller according to the intelligent routing service request packet sent by the user side device.

The intelligent routing service request packet includes characteristic information and the constraint condition, where the characteristic information is used to indicate those data flows, for which the intelligent routing service needs to be established, in various data flows. The characteristic information includes at least one of the following: a source address, a destination address, a source port, a destination port, a protocol number, and the like. In addition, the characteristic information may further include an application-aware type.

The constraint condition in the intelligent routing service request packet is a parameter for flow forwarding path computation performed on a data flow that matches the characteristic information, and the constraint condition includes at least one of the following: bandwidth, a bandwidth priority, a quality of service (quality of service, QoS) priority, a latency level, a congestion level, a value-added service identification number, and the like.

The quality of service (QoS) class may be set manually, for example, the quality of service class may be manually divided into three classes: gold, silver, and bronze; and "gold" class users are provided with the best quality of service, followed by "silver" class users and "bronze" class users in sequence. In different systems, the quality of service class may be set according to a specific requirement, which is not specifically limited herein. For example, the quality of service class may be set by setting a TOS field in an IP packet header.

The latency level may be set manually, for example, the latency level may be manually divided into an ordinary level and an advanced level; and a latency of the ordinary level cannot exceed 30 milliseconds, while a latency of the advanced level cannot exceed 10 milliseconds. In different systems, the latency level may be set according to a specific requirement, which is not specifically limited herein.

The congestion level may be set manually, for example, the congestion level is set to 50%, that is, a congestion rate of an allocated flow forwarding path cannot exceed 50%. In different systems, the congestion level may be set according to a specific requirement, which is not specifically limited herein.

The value-added service identification number is used to identify a type of value-added service processing performed on the data flow that matches the characteristic information, and may be set manually. For example, if the value-added service identification number is "1", it indicates that uniform resource locator (UniformResourceLocator, URL) filtering is performed on the data flow that matches the characteristic information; if the value-added service identification number is "2", it indicates that traffic analysis is performed on the data flow that matches the characteristic information. In different systems, the value-added service identification number may be set according to a specific requirement, which is not specifically limited herein.

For example, if the characteristic information is "a source address is 192.168.1.0, and a destination address is 192.168.1.255", and the constraint condition is "bandwidth is 8 M", it indicates that flow forwarding path computation needs to be performed on a data flow that meets "a source address is 192.168.1.0, and a destination address is 192.168.1.255", so as to obtain a flow forwarding path, which meets "bandwidth is 8 M", of the data flow.

If the characteristic information includes the application-aware type, the processor 1420 is further configured to perform deep packet inspection on the packet so as to determine whether the packet meets the application-aware type.

In another embodiment, the receiver 1410 is further configured to receive the policy control factor and the characteristic information that are sent by a policy server.

Based on the foregoing controller and hybrid forwarding device, the present application further proposes a flow forwarding system. The system includes a client, a hybrid forwarding device, an application server, a controller, and a policy server, where the policy server receives an intelligent routing service request packet sent by the application server, and sends a control policy to the controller according to the intelligent routing service request packet, so that the controller computes an intelligent routing service flow forwarding path according to the control policy, and controls an intelligent routing service packet of the client to be forwarded to the application server according to the intelligent routing service flow forwarding path. For details, refer to FIG. 1 to FIG. 5, and related descriptions thereof; and details are not described herein again.

In the several implementation manners provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the implementation manners.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A flow forwarding method, applied to a Software Defined Network (SDN) migration network, the method comprising:
    receiving, by an edge node, a service packet sent by a user side device;
    determining, in a flow table by the edge node, a first flow table entry corresponding to characteristic information in the service packet, wherein the first flow table entry comprises an action, and the action is used to send a message to a controller, and the first flow table entry was generated by the controller according to an intelligent routing service request packet sent by the user side device;
    sending, by the edge node, a first message to the controller, wherein the first message comprises the characteristic information, identification information of the edge node, and interface attribute information of an interface that receives the service packet, and the interface attribute information indicates that the edge node is an ingress edge-node or an egress edge-node of the service packet in the SDN migration network;
    receiving, by the edge node, a second flow table entry generated and sent by the controller, wherein the second flow table entry meets a constraint condition in the intelligent routing service request packet; and
    processing, by the edge node, the service packet according to the second flow table entry.

2. The method according to claim 1, wherein:
    the first message further comprises a mirrored packet of the service packet and the identification information of the edge node, wherein the mirrored packet of the service packet is a duplicate packet of the service packet, and the service packet comprises the characteristic information; and
    the method further comprises: sending, by the edge node, the service packet according to a traditional IP routing mode.

3. The method according to claim 1, wherein the characteristic information comprises at least one of the following in the service packet: a source address, a destination address, a source port, a destination port, and a protocol number.

4. The method according to claim 3, wherein the characteristic information further comprises an application-aware type.

5. The method according to claim 1, wherein the constraint condition in the intelligent routing service request packet is a parameter for flow forwarding path computation performed on a data flow that matches the characteristic information, and the constraint condition comprises at least one of the following: bandwidth, a bandwidth priority, a quality of service QoS priority, a latency level, a congestion level, and a value-added service identification number, wherein the value-added service identification number is used to identify a type of value-added service processing performed on the data flow that matches the characteristic information.

6. A hybrid forwarding device comprising:
    a receiver configured to receive a service packet sent by a user side device;
    a processor configured to find, in a flow table, a first flow table entry corresponding to characteristic information in the service packet, wherein the first flow table entry comprises an action, and the action is used to send a message to a controller, the first flow table entry was generated by the controller according to an intelligent routing service request packet sent by the user side device, and
    a transmitter configured to send a first message to the controller, wherein the first message comprises the characteristic information, identification information of the device, and interface attribute information of an interface that receives the service packet, and the interface attribute information indicates indicate that the device is an ingress edge-node or an egress edge-node of the service packet in a Software Defined Network (SDN) migration network; wherein:

the receiver is further configured to receive a second flow table entry sent by the controller, wherein the second flow table entry meets a constraint condition in the intelligent routing service request packet, and the processor is further configured to process the service packet according to the second flow table entry.

7. The hybrid forwarding device according to claim 6, wherein:

the first message further comprises a mirrored packet of the service packet and the identification information of the device, wherein the mirrored packet of the service packet is a duplicate packet of the service packet, and the service packet comprises the characteristic information; and the processor is further configured to send the service packet according to a traditional IP routing mode.

8. The hybrid forwarding device according to claim 6, wherein the characteristic information comprises at least one of the following in the service packet: a source address, a destination address, a source port, a destination port, and a protocol number.

9. The hybrid forwarding device according to claim 8, wherein the characteristic information further comprises an application-aware type.

10. The hybrid forwarding device according to claim 6, wherein the constraint condition in the intelligent routing service request packet is a parameter for flow forwarding path computation performed on a data flow that matches the characteristic information, and the constraint condition comprises at least one of the following: bandwidth, a bandwidth priority, a quality of service QoS priority, a latency level, a congestion level, and a value-added service identification number, wherein the value-added service identification number is used to identify a type of value-added service processing performed on the data flow that matches the characteristic information.

11. A controller comprising:

a receiver configured to receive a first message sent by a first edge node, and receive a second message sent by a second edge node, wherein the first message comprises characteristic information of a packet sent by a user side device, identification information of the first edge node and first interface attribute information of a first interface of the first edge node that received the packet, wherein the first interface attribute information indicates that the first edge node is an ingress node of the packet in a Software Defined Network (SDN) migration network, and wherein the second message comprises identification information of the second edge node, the characteristic information and second interface attribute information of a second interface of the second edge node that received the packet, wherein the second interface attribute information indicates that the second edge node is an egress node of the service packet in the SDN migration network;

a processor configured to:

determine that the first edge node is the ingress edge-node that receives the packet in the SDN migration network, and that the second edge node is the egress edge-node that receives the packet in the SDN migration network, according to the first interface attribute information and the second interface attribute information that are received and generate, for all nodes on a flow forwarding path, flow table entries respectively corresponding to the nodes; and a transmitter configured to send the flow table entries separately to the corresponding nodes, wherein a policy control factor is determined according to a constraint condition in an intelligent routing service request packet sent by the user side device.

12. The controller according to claim 11, wherein:

the transmitter is further configured to, when the packet is a service packet, send a first flow table entry separately to the first edge node and the second edge node, wherein the first flow table entry comprises an action, and the action is used to send a message to the controller; and the first flow table entry was generated by the controller according to the intelligent routing service request packet sent by the user side device.

13. The controller according to claim 11, wherein the receiver is further configured to receive the policy control factor and the characteristic information that are sent by a policy server.

14. The controller according to claim 13, wherein:

the characteristic information comprises an application-aware type, and the controller further comprises a deep packet inspection module, wherein the deep packet inspection module is configured to perform deep packet inspection on the packet so as to determine whether the packet meets the application-aware type.

15. The controller according to claim 11, wherein the constraint condition in the intelligent routing service request packet is a parameter for flow forwarding path computation performed on a data flow that matches the characteristic information, and the constraint condition comprises at least one of the following: bandwidth, a bandwidth priority, a quality of service QoS priority, a latency level, a congestion level, and a value-added service identification number, wherein the value-added service identification number is used to identify a type of value-added service processing performed on the data flow that matches the characteristic information.

16. A flow forwarding system comprising:

a plurality of hybrid forwarding devices and a controller, wherein the plurality of hybrid forwarding devices is topologically connected to form a Software Defined Network (SDN) migration network, hybrid forwarding devices located on an edge of the SDN migration network are edge nodes, the edge nodes can communicate with the controller, and the edge nodes comprise a first edge node and a second edge node, wherein:

the first edge node is configured to:

receive a service packet sent by a user side device, find, in a flow table, a first flow table entry corresponding to characteristic information in the service packet, wherein the first flow table entry comprises an action, and the action is used to send a message to the controller; and the first flow table entry was generated by the controller according to an intelligent routing service request packet sent by the user side device, and send a first message to the controller, wherein the first message comprises the characteristic information, identification information of the first edge node, and interface attribute information of an interface that receives the service packet;

the second edge node is configured to:

receive the service packet that is sent by the user side device and forwarded by the first edge node, find, in the flow table, the first flow table entry corresponding to the characteristic information in the service packet, wherein the first flow table entry comprises the action, and the action is used to send a message to the controller, and send a second message to the controller, wherein the second message comprises the characteristic information, identification information of the second edge node, and the interface attribute information of the interface that receives the service packet;

the controller is configured to:

receive the first message sent by the first edge node and the second message sent by the second edge node, determine that the first edge node is an ingress edge-node that receives the packet in the SDN migration network, and that the second edge node is an egress edge-node that receives the packet in the SDN migration network;

compute, according to the identification information of the first edge node, the identification information of the second edge node, and a policy control factor, a flow forwarding path along which an intelligent routing service flow corresponding to the characteristic information needs to pass;

generate, for all nodes on the flow forwarding path, second flow table entries respectively corresponding to the nodes, and send the second flow table entries separately to the corresponding nodes, wherein the policy control factor is determined according to a constraint condition in the intelligent routing service request packet sent by the user side device, and the nodes comprise the first edge node and the second edge node;

wherein the first edge node and the second edge node receive the second flow table entries sent by the controller, wherein the second flow table entries meet the constraint condition in the intelligent routing service request packet, and wherein the first edge node and the second edge node process the service packets according to the second flow table entries.

17. The system according to claim 16, wherein:

the characteristic information comprises an application-aware type, and the controller is further configured to perform deep packet inspection on the packet so as to determine whether the packet meets the application-aware type.

18. The system according to claim 16, wherein the constraint condition in the intelligent routing service request packet is a parameter for flow forwarding path computation performed on a data flow that matches the characteristic information, and the constraint condition comprises at least one of the following: bandwidth, a bandwidth priority, a quality of service QoS priority, a latency level, a congestion level, and a value-added service identification number, wherein the value-added service identification number is used to identify a type of value-added service processing performed on the data flow that matches the characteristic information.

* * * * *